US008010515B2

(12) United States Patent
Mirzad et al.

(10) Patent No.: US 8,010,515 B2
(45) Date of Patent: Aug. 30, 2011

(54) QUERY TO AN ELECTRONIC FORM

(75) Inventors: Nima Mirzad, Seattle, WA (US); Andrew Paul Begun, Redmond, WA (US); Michael B. Palmer, Snohomish, WA (US); Laurent Mollicone, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 402 days.

(21) Appl. No.: 11/107,347

(22) Filed: Apr. 15, 2005

(65) Prior Publication Data

US 2006/0235829 A1   Oct. 19, 2006

(51) Int. Cl.
*G06F 17/30* (2006.01)

(52) U.S. Cl. ........ 707/705; 707/706; 709/223; 709/224; 709/713; 709/714

(58) Field of Classification Search .................. 707/3–5, 707/705; 709/200–206, 213–214
See application file for complete search history.

(56) References Cited

U.S. PATENT DOCUMENTS

| | | |
|---|---|---|
| 2,804,878 A | 9/1957 | Fishwood et al. |
| 3,091,077 A | 5/1963 | Erickson et al. |
| 3,104,520 A | 9/1963 | Cazier et al. |
| 3,195,805 A | 7/1965 | Cholvin et al. |
| 3,196,606 A | 7/1965 | Cholvin et al. |
| 3,812,942 A | 5/1974 | Espenschied et al. |
| 3,874,828 A | 4/1975 | Herschler et al. |
| 3,961,748 A | 6/1976 | McNabney |
| 4,005,578 A | 2/1977 | McInerney |
| 4,005,579 A | 2/1977 | Lloyd |
| 4,060,340 A | 11/1977 | Yanik et al. |
| 4,089,623 A | 5/1978 | Hofmann, Jr. |
| 4,256,019 A | 3/1981 | Braddick |
| 4,362,475 A | 12/1982 | Seitz |
| 4,391,184 A | 7/1983 | Yamane et al. |
| 4,396,345 A | 8/1983 | Hutchinson |
| 4,498,147 A | 2/1985 | Agnew et al. |
| 4,514,800 A | 4/1985 | Gruner et al. |
| 4,514,985 A | 5/1985 | Cadeddu |
| 4,641,274 A | 2/1987 | Swank |
| 4,674,040 A | 6/1987 | Barker et al. |
| 4,723,211 A | 2/1988 | Barker et al. |

(Continued)

FOREIGN PATENT DOCUMENTS

EP   0841615   5/1998

(Continued)

OTHER PUBLICATIONS

Bruce Halberg et al, "Using Microsoft Excel 97", Published 1997, Bestseller Edition, Pertinent pp. 1-9, 18-25, 85-89, 98-101, 106-113, 124-127, 144-147, 190-201, 209-210, 218-227, 581-590, 632-633, 650-655, 712-714.

(Continued)

*Primary Examiner* — Hanh B Thai

(57) ABSTRACT

Systems and/or methods that enable an electronic form to provide data external to the electronic form in response to a query while offline with respect to a data source from which the data originated are described. These systems and methods may also, in one embodiment, receive data from a data source that is capable of being inaccessible and associate that data with an electronic form, a user, and a query. These systems and methods may, in another embodiment, provide data in response to a query made by a user to an electronic form that was previously associated with the electronic form, the user, and the query.

11 Claims, 6 Drawing Sheets

U.S. PATENT DOCUMENTS

| | | |
|---|---|---|
| 4,739,477 A | 4/1988 | Barker et al. |
| 4,815,029 A | 3/1989 | Barker et al. |
| 4,847,749 A | 7/1989 | Collins et al. |
| 4,910,663 A | 3/1990 | Bailey |
| 4,926,476 A | 5/1990 | Covey |
| 4,933,880 A | 6/1990 | Borgendale et al. |
| 4,962,475 A | 10/1990 | Hernandez et al. |
| 5,072,412 A | 12/1991 | Henderson, Jr. et al. |
| 5,140,563 A | 8/1992 | Thinesen |
| 5,179,703 A | 1/1993 | Evans |
| 5,182,709 A | 1/1993 | Makus |
| 5,187,786 A | 2/1993 | Densmore et al. |
| 5,191,645 A | 3/1993 | Carlucci et al. |
| 5,195,183 A | 3/1993 | Miller et al. |
| 5,204,947 A | 4/1993 | Bernstein et al. |
| 5,206,951 A | 4/1993 | Khoyi et al. |
| 5,218,672 A | 6/1993 | Morgan et al. |
| 5,220,649 A | 6/1993 | Forcier |
| 5,237,680 A | 8/1993 | Adams et al. |
| 5,249,275 A | 9/1993 | Srivastava |
| 5,251,273 A | 10/1993 | Betts et al. |
| 5,257,646 A | 11/1993 | Meyer |
| 5,274,803 A | 12/1993 | Dubin et al. |
| 5,297,249 A | 3/1994 | Bernstein et al. |
| 5,297,283 A | 3/1994 | Kelly, Jr. et al. |
| 5,313,631 A | 5/1994 | Kao |
| 5,313,646 A | 5/1994 | Hendricks et al. |
| 5,317,686 A | 5/1994 | Salas et al. |
| 5,333,317 A | 7/1994 | Dann |
| 5,339,423 A | 8/1994 | Beitel et al. |
| 5,339,424 A | 8/1994 | Fushimi |
| 5,341,478 A | 8/1994 | Travis, Jr. et al. |
| 5,369,766 A | 11/1994 | Nakano et al. |
| 5,369,778 A | 11/1994 | San Soucie et al. |
| 5,371,675 A | 12/1994 | Greif et al. |
| 5,377,323 A | 12/1994 | Vasudevan |
| 5,379,419 A | 1/1995 | Heffernan et al. |
| 5,381,547 A | 1/1995 | Flug et al. |
| 5,388,967 A | 2/1995 | Firnhaber et al. |
| 5,388,968 A | 2/1995 | Wood et al. |
| 5,390,325 A | 2/1995 | Miller |
| 5,396,623 A | 3/1995 | McCall et al. |
| 5,408,665 A | 4/1995 | Fitzgerald |
| 5,410,646 A | 4/1995 | Tondevold et al. |
| 5,410,688 A | 4/1995 | Williams et al. |
| 5,412,772 A | 5/1995 | Monson |
| 5,428,738 A | 6/1995 | Carter et al. |
| 5,434,975 A | 7/1995 | Allen |
| 5,436,637 A | 7/1995 | Gayraud et al. |
| 5,438,659 A | 8/1995 | Notess et al. |
| 5,440,744 A | 8/1995 | Jacobson et al. |
| 5,446,842 A | 8/1995 | Schaeffer et al. |
| 5,456,582 A | 10/1995 | Firnhaber et al. |
| 5,459,865 A | 10/1995 | Heninger et al. |
| 5,481,722 A | 1/1996 | Skinner |
| 5,497,489 A | 3/1996 | Menne |
| 5,504,898 A | 4/1996 | Klein |
| 5,517,655 A | 5/1996 | Collins et al. |
| 5,535,389 A | 7/1996 | Elder et al. |
| 5,537,596 A | 7/1996 | Yu et al. |
| 5,540,558 A | 7/1996 | Harden et al. |
| 5,542,070 A | 7/1996 | LeBlanc et al. |
| 5,550,976 A | 8/1996 | Henderson et al. |
| 5,551,035 A | 8/1996 | Arnold et al. |
| 5,556,271 A | 9/1996 | Zuercher et al. |
| 5,572,643 A | 11/1996 | Judson |
| 5,572,648 A | 11/1996 | Bibayan |
| 5,577,252 A | 11/1996 | Nelson et al. |
| 5,581,686 A | 12/1996 | Koppolu et al. |
| 5,581,760 A | 12/1996 | Atkinson et al. |
| 5,602,996 A | 2/1997 | Powers, III et al. |
| 5,608,720 A | 3/1997 | Biegel et al. |
| 5,613,837 A | 3/1997 | Konishi et al. |
| 5,625,783 A | 4/1997 | Ezekiel et al. |
| 5,627,979 A | 5/1997 | Chang et al. |
| 5,630,126 A | 5/1997 | Redpath |
| 5,630,706 A | 5/1997 | Yang |
| 5,634,113 A | 5/1997 | Rusterholz |
| 5,634,121 A | 5/1997 | Tracz et al. |
| 5,640,544 A | 6/1997 | Onodera et al. |
| 5,644,738 A | 7/1997 | Goldman et al. |
| 5,649,099 A | 7/1997 | Theimer et al. |
| 5,655,887 A | 8/1997 | Chou |
| 5,659,729 A | 8/1997 | Nielsen |
| 5,664,133 A | 9/1997 | Malamud et al. |
| 5,664,178 A | 9/1997 | Sinofsky |
| 5,664,938 A | 9/1997 | Yang |
| 5,668,966 A | 9/1997 | Ono et al. |
| 5,669,005 A | 9/1997 | Curbow et al. |
| 5,681,151 A | 10/1997 | Wood |
| 5,682,536 A | 10/1997 | Atkinson et al. |
| 5,689,667 A | 11/1997 | Kurtenbach |
| 5,689,703 A | 11/1997 | Atkinson et al. |
| 5,692,540 A | 12/1997 | Huang |
| 5,704,029 A | 12/1997 | Wright, Jr. |
| 5,706,501 A | 1/1998 | Horikiri et al. |
| 5,717,939 A | 2/1998 | Bricklin et al. |
| 5,721,824 A | 2/1998 | Taylor |
| 5,740,439 A | 4/1998 | Atkinson et al. |
| 5,742,504 A | 4/1998 | Meyer et al. |
| 5,745,683 A | 4/1998 | Lee et al. |
| 5,745,712 A | 4/1998 | Turpin et al. |
| 5,758,184 A | 5/1998 | Lucovsky et al. |
| 5,758,358 A | 5/1998 | Ebbo |
| 5,761,408 A | 6/1998 | Kolawa et al. |
| 5,761,683 A | 6/1998 | Logan et al. |
| 5,764,984 A | 6/1998 | Loucks |
| 5,764,985 A | 6/1998 | Smale |
| 5,778,372 A | 7/1998 | Cordell et al. |
| 5,778,402 A | 7/1998 | Gipson |
| 5,784,555 A | 7/1998 | Stone |
| 5,785,081 A | 7/1998 | Krawczyk et al. |
| 5,787,274 A | 7/1998 | Agrawal et al. |
| 5,790,796 A | 8/1998 | Sadowsky |
| 5,798,757 A | 8/1998 | Smith |
| 5,799,311 A | 8/1998 | Agrawal et al. |
| 5,801,701 A | 9/1998 | Koppolu et al. |
| 5,802,304 A | 9/1998 | Stone |
| 5,803,715 A | 9/1998 | Kitchener |
| 5,806,079 A | 9/1998 | Rivette et al. |
| 5,815,830 A | 9/1998 | Anthony |
| 5,826,031 A | 10/1998 | Nielsen |
| 5,826,265 A | 10/1998 | Van Huben et al. |
| 5,835,777 A | 11/1998 | Staelin |
| 5,838,906 A | 11/1998 | Doyle et al. |
| 5,842,018 A | 11/1998 | Atkinson et al. |
| 5,845,077 A | 12/1998 | Fawcett |
| 5,845,090 A | 12/1998 | Collins, III et al. |
| 5,845,122 A | 12/1998 | Nielsen et al. |
| 5,854,630 A | 12/1998 | Nielsen |
| 5,859,973 A | 1/1999 | Carpenter et al. |
| 5,862,372 A | 1/1999 | Morris et al. |
| 5,864,819 A | 1/1999 | De Armas et al. |
| 5,870,735 A | 2/1999 | Agrawal et al. |
| 5,873,088 A | 2/1999 | Hayashi et al. |
| 5,875,815 A | 3/1999 | Ungerecht et al. |
| 5,905,492 A | 5/1999 | Straub et al. |
| 5,907,621 A | 5/1999 | Bachman et al. |
| 5,907,704 A | 5/1999 | Gudmundson et al. |
| 5,910,895 A | 6/1999 | Proskauer et al. |
| 5,911,776 A | 6/1999 | Guck |
| 5,915,112 A | 6/1999 | Boutcher |
| 5,919,247 A | 7/1999 | Van Hoff et al. |
| 5,922,072 A | 7/1999 | Hutchinson et al. |
| 5,929,858 A | 7/1999 | Shibata et al. |
| RE36,281 E | 8/1999 | Zuercher et al. |
| 5,940,075 A | 8/1999 | Mutschler, III et al. |
| 5,947,711 A | 9/1999 | Myers et al. |
| 5,950,010 A | 9/1999 | Hesse et al. |
| 5,950,221 A | 9/1999 | Draves et al. |
| 5,953,731 A | 9/1999 | Glaser |
| 5,956,481 A | 9/1999 | Walsh et al. |
| 5,960,199 A | 9/1999 | Brodsky et al. |
| 5,963,964 A | 10/1999 | Nielsen |
| 5,974,454 A | 10/1999 | Apfel et al. |
| 5,982,370 A | 11/1999 | Kamper |
| 5,987,480 A | 11/1999 | Donohue et al. |

| Patent | Type | Date | Inventor |
|---|---|---|---|
| 5,991,710 | A | 11/1999 | Papineni |
| 5,991,877 | A | 11/1999 | Luckenbaugh |
| 5,995,103 | A | 11/1999 | Ashe |
| 5,999,740 | A | 12/1999 | Rowley |
| 6,005,570 | A | 12/1999 | Gayraud et al. |
| 6,006,227 | A | 12/1999 | Freeman et al. |
| 6,006,241 | A * | 12/1999 | Purnaveja et al. ............ 715/205 |
| 6,012,066 | A | 1/2000 | Discount et al. |
| 6,014,135 | A | 1/2000 | Fernandes |
| 6,016,520 | A | 1/2000 | Facq et al. |
| 6,018,743 | A | 1/2000 | Xu |
| 6,021,403 | A | 2/2000 | Horvitz et al. |
| 6,026,379 | A | 2/2000 | Haller et al. |
| 6,026,416 | A | 2/2000 | Kanerva et al. |
| 6,031,989 | A | 2/2000 | Cordell |
| 6,035,297 | A | 3/2000 | Van Huben et al. |
| 6,035,309 | A | 3/2000 | Dauerer et al. |
| 6,044,205 | A | 3/2000 | Reed et al. |
| 6,052,531 | A | 4/2000 | Waldin et al. |
| 6,052,710 | A | 4/2000 | Saliba et al. |
| 6,054,987 | A | 4/2000 | Richardson |
| 6,057,837 | A | 5/2000 | Hatakeda et al. |
| 6,058,413 | A | 5/2000 | Flores et al. |
| 6,065,043 | A * | 5/2000 | Domenikos et al. .......... 709/203 |
| 6,069,626 | A | 5/2000 | Cline et al. |
| 6,070,184 | A * | 5/2000 | Blount et al. ................. 709/200 |
| 6,072,870 | A | 6/2000 | Nguyen et al. |
| 6,078,326 | A | 6/2000 | Kilmer et al. |
| 6,078,327 | A | 6/2000 | Liman et al. |
| 6,078,924 | A | 6/2000 | Ainsbury et al. |
| 6,081,610 | A | 6/2000 | Dwork et al. |
| 6,084,585 | A | 7/2000 | Kraft et al. |
| 6,088,679 | A | 7/2000 | Barkley |
| 6,088,708 | A | 7/2000 | Burch et al. |
| 6,091,417 | A | 7/2000 | Lefkowitz |
| 6,094,657 | A | 7/2000 | Hailpern et al. |
| 6,096,096 | A * | 8/2000 | Murphy et al. ................ 717/175 |
| 6,098,081 | A | 8/2000 | Heidorn et al. |
| 6,105,012 | A | 8/2000 | Chang et al. |
| 6,106,570 | A | 8/2000 | Mizuhara |
| 6,108,637 | A | 8/2000 | Blumenau |
| 6,108,783 | A | 8/2000 | Krawczyk et al. |
| 6,115,646 | A | 9/2000 | Fiszman et al. |
| 6,121,965 | A | 9/2000 | Kenney et al. |
| 6,122,647 | A | 9/2000 | Horowitz |
| 6,144,969 | A | 11/2000 | Inokuchi et al. |
| 6,151,624 | A | 11/2000 | Teare et al. |
| 6,154,128 | A | 11/2000 | Wookey et al. |
| 6,163,772 | A | 12/2000 | Kramer et al. |
| 6,167,521 | A | 12/2000 | Smith et al. |
| 6,167,523 | A | 12/2000 | Strong |
| 6,178,551 | B1 | 1/2001 | Sana et al. |
| 6,182,095 | B1 | 1/2001 | Leymaster et al. |
| 6,188,401 | B1 | 2/2001 | Peyer |
| 6,191,797 | B1 | 2/2001 | Politis |
| 6,192,367 | B1 | 2/2001 | Hawley et al. |
| 6,195,661 | B1 | 2/2001 | Filepp et al. |
| 6,199,204 | B1 | 3/2001 | Donohue |
| 6,209,128 | B1 | 3/2001 | Gerard et al. |
| 6,216,152 | B1 | 4/2001 | Wong et al. |
| 6,219,423 | B1 | 4/2001 | Davis |
| 6,219,698 | B1 | 4/2001 | Iannucci et al. |
| 6,225,996 | B1 | 5/2001 | Gibb et al. |
| 6,235,027 | B1 | 5/2001 | Herzon |
| 6,243,088 | B1 | 6/2001 | McCormack et al. |
| 6,247,016 | B1 | 6/2001 | Rastogi et al. |
| 6,253,366 | B1 | 6/2001 | Mutschler, III |
| 6,253,374 | B1 | 6/2001 | Dresevic et al. |
| 6,263,313 | B1 | 7/2001 | Milsted et al. |
| 6,266,810 | B1 | 7/2001 | Tanaka et al. |
| 6,268,852 | B1 | 7/2001 | Lindhorst et al. |
| 6,272,506 | B1 | 8/2001 | Bell |
| 6,275,227 | B1 | 8/2001 | DeStefano |
| 6,275,599 | B1 | 8/2001 | Adler et al. |
| 6,281,896 | B1 | 8/2001 | Alimpich et al. |
| 6,282,709 | B1 | 8/2001 | Reha et al. |
| 6,282,711 | B1 | 8/2001 | Halpern et al. |
| 6,286,033 | B1 | 9/2001 | Kishinsky et al. |
| 6,286,130 | B1 | 9/2001 | Poulsen et al. |
| 6,292,897 | B1 | 9/2001 | Gennaro et al. |
| 6,292,941 | B1 | 9/2001 | Jollands |
| 6,297,819 | B1 | 10/2001 | Furst |
| 6,300,948 | B1 | 10/2001 | Geller et al. |
| 6,307,955 | B1 | 10/2001 | Zank et al. |
| 6,308,179 | B1 | 10/2001 | Petersen et al. |
| 6,311,221 | B1 | 10/2001 | Raz et al. |
| 6,311,271 | B1 | 10/2001 | Gennaro et al. |
| 6,321,259 | B1 | 11/2001 | Ouellette et al. |
| 6,321,334 | B1 | 11/2001 | Jerger et al. |
| 6,327,628 | B1 | 12/2001 | Anuff et al. |
| 6,331,864 | B1 | 12/2001 | Coco et al. |
| 6,336,214 | B1 | 1/2002 | Sundaresan |
| 6,336,797 | B1 | 1/2002 | Kazakis et al. |
| 6,342,907 | B1 | 1/2002 | Petty et al. |
| 6,343,302 | B1 | 1/2002 | Graham |
| 6,343,377 | B1 | 1/2002 | Gessner et al. |
| 6,344,862 | B1 | 2/2002 | Williams et al. |
| 6,345,256 | B1 | 2/2002 | Milsted et al. |
| 6,345,278 | B1 | 2/2002 | Hitchcock et al. |
| 6,345,361 | B1 | 2/2002 | Jerger et al. |
| 6,347,323 | B1 | 2/2002 | Garber et al. |
| 6,349,408 | B1 | 2/2002 | Smith |
| 6,353,926 | B1 | 3/2002 | Parthesarathy et al. |
| 6,356,906 | B1 | 3/2002 | Lippert et al. |
| 6,357,038 | B1 | 3/2002 | Scouten |
| 6,366,907 | B1 | 4/2002 | Fanning et al. |
| 6,366,912 | B1 | 4/2002 | Wallent et al. |
| 6,367,013 | B1 | 4/2002 | Bisbee et al. |
| 6,369,840 | B1 | 4/2002 | Barnett et al. |
| 6,369,841 | B1 | 4/2002 | Salomon et al. |
| 6,374,402 | B1 | 4/2002 | Schmeidler et al. |
| 6,381,742 | B2 | 4/2002 | Forbes et al. |
| 6,381,743 | B1 | 4/2002 | Mutschler, III |
| 6,385,767 | B1 | 5/2002 | Ziebell |
| 6,389,434 | B1 | 5/2002 | Rivette |
| 6,393,456 | B1 | 5/2002 | Ambler et al. |
| 6,393,469 | B1 | 5/2002 | Dozier et al. |
| 6,396,488 | B1 | 5/2002 | Simmons et al. |
| 6,397,264 | B1 | 5/2002 | Stasnick et al. |
| 6,401,077 | B1 | 6/2002 | Godden et al. |
| 6,405,221 | B1 | 6/2002 | Levine et al. |
| 6,405,238 | B1 | 6/2002 | Votipka |
| 6,408,311 | B1 | 6/2002 | Baisley et al. |
| 6,414,700 | B1 | 7/2002 | Kurtenbach et al. |
| 6,421,070 | B1 | 7/2002 | Ramos et al. |
| 6,421,656 | B1 | 7/2002 | Cheng et al. |
| 6,421,777 | B1 | 7/2002 | Pierre-Louis |
| 6,425,125 | B1 | 7/2002 | Fries et al. |
| 6,427,142 | B1 | 7/2002 | Zachary et al. |
| 6,429,885 | B1 | 8/2002 | Saib et al. |
| 6,434,563 | B1 | 8/2002 | Pasquali et al. |
| 6,434,564 | B1 | 8/2002 | Ebert |
| 6,434,743 | B1 | 8/2002 | Click et al. |
| 6,442,563 | B1 | 8/2002 | Bacon et al. |
| 6,442,755 | B1 | 8/2002 | Lemmons et al. |
| 6,446,110 | B1 | 9/2002 | Lection et al. |
| 6,449,617 | B1 | 9/2002 | Quinn et al. |
| 6,457,009 | B1 | 9/2002 | Bollay |
| 6,460,058 | B2 | 10/2002 | Koppulu |
| 6,463,419 | B1 | 10/2002 | Kluss |
| 6,470,349 | B1 | 10/2002 | Heninger |
| 6,473,800 | B1 | 10/2002 | Jerger et al. |
| 6,476,828 | B1 | 11/2002 | Burkett et al. |
| 6,476,833 | B1 | 11/2002 | Moshfeghi |
| 6,477,544 | B1 | 11/2002 | Bolosky |
| 6,480,860 | B1 | 11/2002 | Monday |
| 6,487,566 | B1 | 11/2002 | Sundaresan |
| 6,490,601 | B1 | 12/2002 | Markus et al. |
| 6,493,006 | B1 | 12/2002 | Gourdol et al. |
| 6,493,007 | B1 | 12/2002 | Pang |
| 6,493,702 | B1 | 12/2002 | Adar et al. |
| 6,502,101 | B1 | 12/2002 | Verprauskus et al. |
| 6,502,103 | B1 | 12/2002 | Frey et al. |
| 6,505,200 | B1 * | 1/2003 | Ims et al. .......................... 707/8 |
| 6,505,230 | B1 | 1/2003 | Mohan et al. |
| 6,505,300 | B2 | 1/2003 | Chan et al. |
| 6,505,344 | B1 | 1/2003 | Blais et al. |
| 6,507,856 | B1 | 1/2003 | Chen et al. |

| | | |
|---|---|---|
| 6,513,154 B1 | 1/2003 | Porterfield |
| 6,516,322 B1 | 2/2003 | Meredith |
| 6,519,617 B1 | 2/2003 | Wanderski et al. |
| 6,523,027 B1 | 2/2003 | Underwood |
| 6,529,909 B1 | 3/2003 | Bowman-Amuah |
| 6,535,229 B1 | 3/2003 | Kraft |
| 6,535,883 B1 | 3/2003 | Lee et al. |
| 6,539,464 B1 | 3/2003 | Getov |
| RE38,070 E | 4/2003 | Spies et al. |
| 6,546,546 B1 | 4/2003 | Van Doorn |
| 6,546,554 B1 | 4/2003 | Schmidt et al. |
| 6,549,221 B1 | 4/2003 | Brown et al. |
| 6,549,878 B1 | 4/2003 | Lowry et al. |
| 6,549,922 B1 | 4/2003 | Srivastava et al. |
| 6,553,402 B1 | 4/2003 | Makarios et al. |
| 6,560,616 B1 | 5/2003 | Garber |
| 6,560,620 B1 | 5/2003 | Ching |
| 6,560,640 B2 | 5/2003 | Smethers |
| 6,563,514 B1 | 5/2003 | Samar |
| 6,571,253 B1 | 5/2003 | Thompson et al. |
| 6,578,144 B1 | 6/2003 | Gennaro et al. |
| 6,581,061 B2 | 6/2003 | Graham |
| 6,584,469 B1 | 6/2003 | Chiang et al. |
| 6,584,548 B1 | 6/2003 | Bourne et al. |
| 6,585,778 B1 | 7/2003 | Hind et al. |
| 6,589,290 B1 | 7/2003 | Maxwell et al. |
| 6,598,219 B1 | 7/2003 | Lau |
| 6,603,489 B1 * | 8/2003 | Edlund et al. ............... 715/780 |
| 6,604,099 B1 | 8/2003 | Chung et al. |
| 6,604,238 B1 | 8/2003 | Lim et al. |
| 6,606,606 B2 | 8/2003 | Starr |
| 6,609,200 B2 | 8/2003 | Anderson et al. |
| 6,611,812 B2 * | 8/2003 | Hurtado et al. ............... 705/26 |
| 6,611,822 B1 | 8/2003 | Beams et al. |
| 6,611,840 B1 | 8/2003 | Baer et al. |
| 6,613,098 B1 | 9/2003 | Sorge et al. |
| 6,615,276 B1 | 9/2003 | Mastrianni et al. |
| 6,625,622 B1 | 9/2003 | Henrickson et al. |
| 6,629,109 B1 | 9/2003 | Koshisaka |
| 6,631,357 B1 | 10/2003 | Perkowski |
| 6,631,379 B2 | 10/2003 | Cox |
| 6,631,497 B1 | 10/2003 | Jamshidi et al. |
| 6,631,519 B1 | 10/2003 | Nicholson et al. |
| 6,632,251 B1 | 10/2003 | Rutten et al. |
| 6,633,315 B1 | 10/2003 | Sobeski et al. |
| 6,635,089 B1 | 10/2003 | Burkett et al. |
| 6,636,845 B2 | 10/2003 | Chau et al. |
| 6,640,249 B1 | 10/2003 | Bowman-Amuah |
| 6,643,633 B2 | 11/2003 | Chau et al. |
| 6,643,652 B2 | 11/2003 | Helgeson et al. |
| 6,643,684 B1 | 11/2003 | Malkin et al. |
| 6,651,217 B1 | 11/2003 | Kennedy et al. |
| 6,654,737 B1 | 11/2003 | Nunez |
| 6,654,932 B1 | 11/2003 | Bahrs et al. |
| 6,658,417 B1 | 12/2003 | Stakutis et al. |
| 6,658,622 B1 | 12/2003 | Aiken et al. |
| 6,658,652 B1 | 12/2003 | Alexander et al. |
| 6,668,369 B1 | 12/2003 | Krebs et al. |
| 6,671,805 B1 | 12/2003 | Brown et al. |
| 6,675,202 B1 | 1/2004 | Perttunen |
| 6,678,717 B1 | 1/2004 | Schneider |
| 6,691,230 B1 | 2/2004 | Bardon |
| 6,691,281 B1 | 2/2004 | Sorge et al. |
| 6,697,944 B1 | 2/2004 | Jones et al. |
| 6,701,434 B1 | 3/2004 | Rohatgi |
| 6,701,486 B1 | 3/2004 | Weber et al. |
| 6,704,906 B1 | 3/2004 | Yankovich et al. |
| 6,711,679 B1 | 3/2004 | Guski et al. |
| 6,720,985 B1 | 4/2004 | Silverbrook et al. |
| 6,725,426 B1 | 4/2004 | Pavlov |
| 6,735,721 B1 | 5/2004 | Morrow et al. |
| 6,748,385 B1 | 6/2004 | Rodkin |
| 6,748,569 B1 | 6/2004 | Brooke et al. |
| 6,751,777 B2 | 6/2004 | Bates |
| 6,754,874 B1 | 6/2004 | Richman |
| 6,757,868 B1 | 6/2004 | Glaser et al. |
| 6,760,723 B2 | 7/2004 | Oshinsky et al. |
| 6,763,343 B1 | 7/2004 | Brooke et al. |
| 6,766,526 B1 | 7/2004 | Ellis |
| 6,772,139 B1 | 8/2004 | Smith, III |
| 6,772,165 B2 | 8/2004 | O'Carroll |
| 6,774,926 B1 | 8/2004 | Ellis et al. |
| 6,779,154 B1 | 8/2004 | Nussbaum et al. |
| 6,781,609 B1 | 8/2004 | Barker et al. |
| 6,799,299 B1 | 9/2004 | Li et al. |
| 6,801,929 B1 | 10/2004 | Donoho et al. |
| 6,816,849 B1 | 11/2004 | Halt, Jr. |
| 6,823,478 B1 | 11/2004 | Prologo et al. |
| 6,828,992 B1 | 12/2004 | Freeman et al. |
| 6,829,745 B2 | 12/2004 | Yassin et al. |
| 6,845,380 B2 | 1/2005 | Su et al. |
| 6,845,499 B2 | 1/2005 | Srivastava et al. |
| 6,847,387 B2 | 1/2005 | Roth |
| 6,848,078 B1 | 1/2005 | Birsan et al. |
| 6,850,895 B2 | 2/2005 | Brodersen et al. |
| 6,862,689 B2 | 3/2005 | Bergsten et al. |
| 6,871,220 B1 | 3/2005 | Rajan et al. |
| 6,871,345 B1 | 3/2005 | Crow et al. |
| 6,874,130 B1 | 3/2005 | Baweja et al. |
| 6,874,143 B1 | 3/2005 | Murray |
| 6,876,996 B2 | 4/2005 | Czajkowski et al. |
| 6,883,168 B1 | 4/2005 | James et al. |
| 6,885,748 B1 * | 4/2005 | Wang ............................ 380/201 |
| 6,889,359 B1 | 5/2005 | Conner et al. |
| 6,901,403 B1 | 5/2005 | Bata et al. |
| 6,915,454 B1 | 7/2005 | Moore et al. |
| 6,925,609 B1 | 8/2005 | Lucke |
| 6,931,532 B1 | 8/2005 | Davis et al. |
| 6,941,129 B2 | 9/2005 | Marce et al. |
| 6,941,510 B1 | 9/2005 | Ozzie et al. |
| 6,941,511 B1 | 9/2005 | Hind et al. |
| 6,941,521 B2 | 9/2005 | Lin et al. |
| 6,948,133 B2 | 9/2005 | Haley |
| 6,948,135 B1 | 9/2005 | Ruthfield et al. |
| 6,950,980 B1 | 9/2005 | Malcolm |
| 6,950,987 B1 | 9/2005 | Hargraves et al. |
| 6,957,395 B1 | 10/2005 | Jobs et al. |
| 6,961,897 B1 | 11/2005 | Peel, Jr. et al. |
| 6,963,875 B2 | 11/2005 | Moore et al. |
| 6,968,503 B1 | 11/2005 | Chang et al. |
| 6,968,505 B2 | 11/2005 | Stoll et al. |
| 6,993,714 B2 | 1/2006 | Kaler et al. |
| 6,993,722 B1 | 1/2006 | Greer et al. |
| 6,996,776 B1 | 2/2006 | Makely et al. |
| 6,996,781 B1 | 2/2006 | Myers et al. |
| 7,003,548 B1 | 2/2006 | Barck et al. |
| 7,003,722 B2 | 2/2006 | Rothchiller et al. |
| 7,010,580 B1 | 3/2006 | Fu et al. |
| 7,024,417 B1 | 4/2006 | Russakovsky et al. |
| 7,032,170 B2 | 4/2006 | Poulose |
| 7,036,072 B1 | 4/2006 | Sulistio et al. |
| 7,039,875 B2 | 5/2006 | Khalfay et al. |
| 7,051,273 B1 | 5/2006 | Holt et al. |
| 7,058,645 B2 | 6/2006 | Seto et al. |
| 7,058,663 B2 | 6/2006 | Johnston et al. |
| 7,062,764 B2 | 6/2006 | Cohen et al. |
| 7,065,493 B1 | 6/2006 | Homsi |
| 7,080,325 B2 | 7/2006 | Treibach-Heck et al. |
| 7,081,882 B2 | 7/2006 | Sowden et al. |
| 7,086,009 B2 | 8/2006 | Resnick et al. |
| 7,086,042 B2 | 8/2006 | Abe et al. |
| 7,088,374 B2 | 8/2006 | David et al. |
| 7,103,611 B2 | 9/2006 | Murthy et al. |
| 7,106,888 B1 | 9/2006 | Silverbrook et al. |
| 7,107,282 B1 | 9/2006 | Yalamanchi |
| 7,107,521 B2 | 9/2006 | Santos |
| 7,107,522 B1 | 9/2006 | Morgan et al. |
| 7,107,539 B2 | 9/2006 | Abbott et al. |
| 7,120,863 B1 | 10/2006 | Wang |
| 7,124,167 B1 | 10/2006 | Bellotti et al. |
| 7,124,251 B2 | 10/2006 | Clark et al. |
| 7,130,885 B2 * | 10/2006 | Chandra et al. ............... 709/206 |
| 7,143,341 B1 | 11/2006 | Kohli |
| 7,152,027 B2 | 12/2006 | Andrade et al. |
| 7,152,205 B2 | 12/2006 | Day et al. |
| 7,159,011 B1 * | 1/2007 | Knight et al. ............... 709/207 |
| 7,190,376 B1 | 3/2007 | Tonisson |
| 7,191,394 B1 | 3/2007 | Ardeleanu et al. |

| Patent/Pub No. | Date | Inventor |
|---|---|---|
| 7,197,515 B2 | 3/2007 | Rivers-Moore et al. |
| 7,200,665 B2 | 4/2007 | Eshghi et al. |
| 7,213,200 B2 | 5/2007 | Abe et al. |
| 7,228,541 B2 | 6/2007 | Gupton et al. |
| 7,234,105 B2 | 6/2007 | Bezrukov et al. |
| 7,237,114 B1 | 6/2007 | Rosenberg |
| 7,251,777 B1 | 7/2007 | Valtchev et al. |
| 7,269,664 B2 | 9/2007 | Hutsch et al. |
| 7,269,788 B2 | 9/2007 | Gharavy |
| 7,272,815 B1 | 9/2007 | Eldridge |
| 7,275,216 B2 | 9/2007 | Paoli et al. |
| 7,281,018 B1 | 10/2007 | Begun et al. |
| 7,281,206 B2 | 10/2007 | Schnelle et al. |
| 7,281,245 B2 | 10/2007 | Reynar et al. |
| 7,293,268 B2 | 11/2007 | Masuda et al. |
| 7,296,017 B2 | 11/2007 | Larcheveque et al. |
| 7,308,646 B1 | 12/2007 | Cohen et al. |
| 7,313,757 B2 | 12/2007 | Bradley et al. |
| 7,346,848 B1 | 3/2008 | Ruthfield et al. |
| 7,370,066 B1 | 5/2008 | Sikchi et al. |
| 7,376,673 B1 | 5/2008 | Chalecki et al. |
| 7,406,660 B1 | 7/2008 | Sikchi et al. |
| 7,430,711 B2 | 9/2008 | Rivers-Moore et al. |
| 7,441,200 B2 | 10/2008 | Savage |
| 7,451,392 B1 | 11/2008 | Chalecki et al. |
| 7,490,109 B1 | 2/2009 | Sikchi et al. |
| 7,490,167 B2 | 2/2009 | Pena et al. |
| 7,496,632 B2 | 2/2009 | Chapman et al. |
| 7,496,837 B1 | 2/2009 | Larcheveque et al. |
| 7,512,896 B2 | 3/2009 | Rockey et al. |
| 7,516,399 B2 | 4/2009 | Hsu et al. |
| 7,533,268 B1 | 5/2009 | Catorcini |
| 7,543,228 B2 | 6/2009 | Kelkar |
| 7,549,115 B1 | 6/2009 | Kotler |
| 7,562,215 B2 | 7/2009 | Cummins |
| 7,568,101 B1 | 7/2009 | Catorcini et al. |
| 7,581,177 B1 | 8/2009 | Mollicone et al. |
| 7,584,417 B2 | 9/2009 | Friend |
| 7,610,562 B2 | 10/2009 | Rockey et al. |
| 7,613,996 B2 | 11/2009 | Dallett et al. |
| 7,624,356 B1 | 11/2009 | Rockey et al. |
| 7,653,687 B2 | 1/2010 | Reisiman |
| 7,669,116 B2 | 2/2010 | Lopata et al. |
| 7,673,227 B2 | 3/2010 | Kotler et al. |
| 7,673,228 B2 | 3/2010 | Kelkar et al. |
| 7,676,843 B1 | 3/2010 | Stott et al. |
| 7,689,929 B2 | 3/2010 | Ruthfield |
| 7,692,636 B2 | 4/2010 | Kim |
| 7,712,022 B2 | 5/2010 | Smuga et al. |
| 7,712,048 B2 | 5/2010 | Rockey et al. |
| 7,721,190 B2 | 5/2010 | Sikchi et al. |
| 7,725,834 B2 | 5/2010 | Bell |
| 7,743,063 B2 | 6/2010 | James et al. |
| 7,774,620 B1 | 8/2010 | Stott |
| 7,779,027 B2 | 8/2010 | James |
| 7,809,698 B1 | 10/2010 | Salz et al. |
| 7,818,677 B2 | 10/2010 | Ruthfield et al. |
| 7,865,477 B2 | 1/2011 | Larcheveque |
| 7,900,134 B2 | 3/2011 | Ardeleanu |
| 7,913,159 B2 | 3/2011 | Larcheveque |
| 2001/0003828 A1* | 6/2001 | Peterson et al. ............ 709/219 |
| 2001/0007109 A1 | 7/2001 | Lange |
| 2001/0016880 A1 | 8/2001 | Cai et al. |
| 2001/0022592 A1 | 9/2001 | Alimpich et al. |
| 2001/0024195 A1 | 9/2001 | Hayakawa |
| 2001/0037345 A1 | 11/2001 | Kiernan |
| 2001/0044850 A1 | 11/2001 | Raz et al. |
| 2001/0051928 A1 | 12/2001 | Brody |
| 2001/0052121 A1 | 12/2001 | Masuda et al. |
| 2001/0054004 A1 | 12/2001 | Powers |
| 2001/0056411 A1 | 12/2001 | Lindskog et al. |
| 2001/0056429 A1 | 12/2001 | Moore |
| 2001/0056460 A1 | 12/2001 | Sahota et al. |
| 2002/0010700 A1 | 1/2002 | Wotring |
| 2002/0010743 A1 | 1/2002 | Ryan et al. |
| 2002/0010746 A1 | 1/2002 | Jilk, Jr. et al. |
| 2002/0010855 A1 | 1/2002 | Reshef et al. |
| 2002/0013788 A1 | 1/2002 | Pennell et al. |
| 2002/0023111 A1 | 2/2002 | Arora et al. |
| 2002/0026441 A1 | 2/2002 | Kutay et al. |
| 2002/0026461 A1 | 2/2002 | Kutay et al. |
| 2002/0032590 A1 | 3/2002 | Anand et al. |
| 2002/0032692 A1 | 3/2002 | Suzuki et al. |
| 2002/0032706 A1 | 3/2002 | Perla et al. |
| 2002/0032768 A1 | 3/2002 | Voskuil |
| 2002/0035579 A1 | 3/2002 | Wang et al. |
| 2002/0035581 A1 | 3/2002 | Reynar et al. |
| 2002/0040469 A1 | 4/2002 | Pramberger |
| 2002/0049790 A1 | 4/2002 | Ricker et al. |
| 2002/0052769 A1 | 5/2002 | Navani et al. |
| 2002/0053021 A1 | 5/2002 | Rice et al. |
| 2002/0054128 A1 | 5/2002 | Lau et al. |
| 2002/0057297 A1 | 5/2002 | Grimes et al. |
| 2002/0065798 A1 | 5/2002 | Bostleman et al. |
| 2002/0070973 A1* | 6/2002 | Croley ............ 345/780 |
| 2002/0078074 A1 | 6/2002 | Cho et al. |
| 2002/0078103 A1 | 6/2002 | Gorman et al. |
| 2002/0083145 A1* | 6/2002 | Perinpanathan ............ 709/213 |
| 2002/0083148 A1* | 6/2002 | Shaw et al. ............ 709/214 |
| 2002/0091738 A1 | 7/2002 | Rohrabaugh et al. |
| 2002/0100027 A1 | 7/2002 | Binding et al. |
| 2002/0107885 A1 | 8/2002 | Brooks et al. |
| 2002/0111699 A1* | 8/2002 | Melli et al. ............ 700/18 |
| 2002/0111932 A1 | 8/2002 | Roberge et al. |
| 2002/0112224 A1 | 8/2002 | Cox |
| 2002/0129056 A1 | 9/2002 | Conant |
| 2002/0133484 A1 | 9/2002 | Chau et al. |
| 2002/0147726 A1 | 10/2002 | Yehia et al. |
| 2002/0147748 A1 | 10/2002 | Huang |
| 2002/0152244 A1 | 10/2002 | Dean et al. |
| 2002/0156772 A1 | 10/2002 | Chau et al. |
| 2002/0156846 A1 | 10/2002 | Rawat et al. |
| 2002/0156929 A1 | 10/2002 | Hekmatpour |
| 2002/0169752 A1 | 11/2002 | Kusama et al. |
| 2002/0169789 A1 | 11/2002 | Kutay et al. |
| 2002/0174147 A1 | 11/2002 | Wang et al. |
| 2002/0174417 A1 | 11/2002 | Sijacic et al. |
| 2002/0178187 A1 | 11/2002 | Rasmussen et al. |
| 2002/0184188 A1 | 12/2002 | Mandyam et al. |
| 2002/0184213 A1 | 12/2002 | Lau et al. |
| 2002/0184219 A1 | 12/2002 | Preisig et al. |
| 2002/0184401 A1 | 12/2002 | Kadel, Jr. et al. |
| 2002/0184485 A1 | 12/2002 | Dray et al. |
| 2002/0188597 A1 | 12/2002 | Kern et al. |
| 2002/0188613 A1 | 12/2002 | Chakraborty et al. |
| 2002/0194219 A1 | 12/2002 | Bradley et al. |
| 2002/0196281 A1 | 12/2002 | Audleman et al. |
| 2002/0196288 A1 | 12/2002 | Emrani |
| 2002/0198891 A1 | 12/2002 | Li et al. |
| 2002/0198935 A1 | 12/2002 | Crandall, Sr. et al. |
| 2003/0004951 A1 | 1/2003 | Chokshi |
| 2003/0007000 A1 | 1/2003 | Carlson et al. |
| 2003/0014397 A1 | 1/2003 | Chau et al. |
| 2003/0018668 A1 | 1/2003 | Britton et al. |
| 2003/0020746 A1 | 1/2003 | Chen et al. |
| 2003/0023641 A1 | 1/2003 | Gorman et al. |
| 2003/0025693 A1 | 2/2003 | Haley |
| 2003/0025732 A1 | 2/2003 | Prichard |
| 2003/0029911 A1 | 2/2003 | Kitayama |
| 2003/0033037 A1 | 2/2003 | Yuen et al. |
| 2003/0037021 A1 | 2/2003 | Krothappalli et al. |
| 2003/0037303 A1 | 2/2003 | Bodlaender et al. |
| 2003/0038788 A1 | 2/2003 | Demartines et al. |
| 2003/0038846 A1 | 2/2003 | Hori et al. |
| 2003/0043986 A1 | 3/2003 | Creamer et al. |
| 2003/0046665 A1 | 3/2003 | Ilin |
| 2003/0048301 A1 | 3/2003 | Menninger |
| 2003/0051243 A1 | 3/2003 | Lemmons et al. |
| 2003/0055811 A1 | 3/2003 | Stork et al. |
| 2003/0055828 A1 | 3/2003 | Koch et al. |
| 2003/0056198 A1 | 3/2003 | Al-Azzawe et al. |
| 2003/0058286 A1 | 3/2003 | Dano |
| 2003/0061386 A1 | 3/2003 | Brown et al. |
| 2003/0061567 A1 | 3/2003 | Brown et al. |
| 2003/0069881 A1 | 4/2003 | Huttunen |
| 2003/0074279 A1 | 4/2003 | Viswanath |
| 2003/0084424 A1 | 5/2003 | Reddy et al. |
| 2003/0093755 A1 | 5/2003 | O'Carroll |

| | | | | | | |
|---|---|---|---|---|---|---|
| 2003/0110443 A1* | 6/2003 | Yankovich et al. ........ 715/501.1 | 2004/0148178 A1 | 7/2004 | Brain | |
| 2003/0120578 A1 | 6/2003 | Newman | 2004/0148514 A1 | 7/2004 | Fee et al. | |
| 2003/0120651 A1 | 6/2003 | Bernstein et al. | 2004/0148571 A1 | 7/2004 | Lue | |
| 2003/0120659 A1 | 6/2003 | Sridhar | 2004/0162741 A1 | 8/2004 | Flaxer et al. | |
| 2003/0120671 A1 | 6/2003 | Kim et al. | 2004/0163041 A1 | 8/2004 | Engel | |
| 2003/0120686 A1 | 6/2003 | Kim et al. | 2004/0163046 A1 | 8/2004 | Chu et al. | |
| 2003/0126555 A1 | 7/2003 | Aggarwal et al. | 2004/0172442 A1 | 9/2004 | Ripley | |
| 2003/0128196 A1 | 7/2003 | Lapstun et al. | 2004/0181543 A1 | 9/2004 | Wu et al. | |
| 2003/0135825 A1 | 7/2003 | Gertner et al. | 2004/0186762 A1 | 9/2004 | Beaven et al. | |
| 2003/0140132 A1 | 7/2003 | Champagne et al. | 2004/0189716 A1 | 9/2004 | Paoli et al. | |
| 2003/0140160 A1 | 7/2003 | Raz et al. | 2004/0194035 A1 | 9/2004 | Chakraborty | |
| 2003/0142072 A1 | 7/2003 | Lapstun et al. | 2004/0196266 A1 | 10/2004 | Matsuura et al. | |
| 2003/0149934 A1 | 8/2003 | Worden | 2004/0199572 A1 | 10/2004 | Hunt et al. | |
| 2003/0154464 A1 | 8/2003 | Ullmann et al. | 2004/0205473 A1 | 10/2004 | Fisher et al. | |
| 2003/0158897 A1 | 8/2003 | Ben-Natan et al. | 2004/0205525 A1 | 10/2004 | Murren et al. | |
| 2003/0163285 A1 | 8/2003 | Nakamura et al. | 2004/0205534 A1 | 10/2004 | Koelle | |
| 2003/0167277 A1 | 9/2003 | Hejlsberg et al. | 2004/0205571 A1 | 10/2004 | Adler et al. | |
| 2003/0172113 A1 | 9/2003 | Cameron et al. | 2004/0205592 A1 | 10/2004 | Huang | |
| 2003/0182268 A1 | 9/2003 | Lal | 2004/0205605 A1 | 10/2004 | Adler et al. | |
| 2003/0182327 A1 | 9/2003 | Ramanujam et al. | 2004/0205644 A1 | 10/2004 | Shaughnessy et al. | |
| 2003/0187756 A1 | 10/2003 | Klivington et al. | 2004/0205653 A1 | 10/2004 | Hadfield et al. | |
| 2003/0187930 A1 | 10/2003 | Ghaffar et al. | 2004/0205671 A1 | 10/2004 | Sukehiro et al. | |
| 2003/0188260 A1 | 10/2003 | Jensen et al. | 2004/0210645 A1 | 10/2004 | Kouznetsov et al. | |
| 2003/0189593 A1 | 10/2003 | Yarvin | 2004/0216084 A1 | 10/2004 | Brown et al. | |
| 2003/0192008 A1 | 10/2003 | Lee | 2004/0221238 A1 | 11/2004 | Cifra et al. | |
| 2003/0200506 A1 | 10/2003 | Abe et al. | 2004/0221245 A1 | 11/2004 | Chickles et al. | |
| 2003/0204481 A1 | 10/2003 | Lau | 2004/0237030 A1 | 11/2004 | Malkin | |
| 2003/0204511 A1 | 10/2003 | Brundage et al. | 2004/0260593 A1 | 12/2004 | Abraham-Fuchs et al. | |
| 2003/0204814 A1 | 10/2003 | Elo et al. | 2004/0261019 A1 | 12/2004 | Imamura et al. | |
| 2003/0205615 A1 | 11/2003 | Marappan | 2004/0268229 A1 | 12/2004 | Paoli et al. | |
| 2003/0210428 A1 | 11/2003 | Bevlin et al. | 2004/0268259 A1 | 12/2004 | Rockey et al. | |
| 2003/0212664 A1 | 11/2003 | Breining et al. | 2004/0268260 A1 | 12/2004 | Rockey et al. | |
| 2003/0212988 A1 | 11/2003 | Tsai et al. | 2005/0004893 A1 | 1/2005 | Sangroniz | |
| 2003/0217053 A1 | 11/2003 | Bachman et al. | 2005/0005248 A1 | 1/2005 | Rockey et al. | |
| 2003/0218620 A1 | 11/2003 | Lai et al. | 2005/0015732 A1 | 1/2005 | Vedula et al. | |
| 2003/0220930 A1 | 11/2003 | Milleker et al. | 2005/0027757 A1 | 2/2005 | Kiessig et al. | |
| 2003/0225469 A1 | 12/2003 | DeRemer et al. | 2005/0028073 A1 | 2/2005 | Henry et al. | |
| 2003/0225768 A1 | 12/2003 | Chaudhuri et al. | 2005/0033626 A1 | 2/2005 | Kruse et al. | |
| 2003/0225829 A1 | 12/2003 | Pena et al. | 2005/0038711 A1* | 2/2005 | Marlelo ......................... 705/26 | |
| 2003/0226111 A1 | 12/2003 | Wirts et al. | 2005/0050066 A1 | 3/2005 | Hughes | |
| 2003/0226132 A1 | 12/2003 | Tondreau et al. | 2005/0055627 A1 | 3/2005 | Lloyd et al. | |
| 2003/0233374 A1 | 12/2003 | Spinola et al. | 2005/0060324 A1 | 3/2005 | Johnson et al. | |
| 2003/0236859 A1 | 12/2003 | Vaschillo et al. | 2005/0060647 A1 | 3/2005 | Doan et al. | |
| 2003/0237046 A1 | 12/2003 | Parker et al. | 2005/0065933 A1 | 3/2005 | Goering | |
| 2003/0237047 A1 | 12/2003 | Borson | 2005/0065936 A1 | 3/2005 | Goering | |
| 2004/0002939 A1 | 1/2004 | Arora et al. | 2005/0066287 A1 | 3/2005 | Tattrie et al. | |
| 2004/0002950 A1 | 1/2004 | Brennan et al. | 2005/0071752 A1 | 3/2005 | Marlatt | |
| 2004/0003031 A1 | 1/2004 | Brown et al. | 2005/0076022 A1* | 4/2005 | Wu et al. ............................ 707/3 | |
| 2004/0003341 A1 | 1/2004 | alSafadi et al. | 2005/0076049 A1 | 4/2005 | Qubti et al. | |
| 2004/0003353 A1 | 1/2004 | Rivera et al. | 2005/0080801 A1 | 4/2005 | Kothandaraman et al. | |
| 2004/0003389 A1 | 1/2004 | Reynar et al. | 2005/0091285 A1 | 4/2005 | Krishnan et al. | |
| 2004/0006744 A1 | 1/2004 | Jones et al. | 2005/0091305 A1 | 4/2005 | Lange et al. | |
| 2004/0010752 A1 | 1/2004 | Chan et al. | 2005/0097536 A1 | 5/2005 | Bernstein et al. | |
| 2004/0010753 A1 | 1/2004 | Salter | 2005/0102370 A1 | 5/2005 | Lin et al. | |
| 2004/0015778 A1* | 1/2004 | Britton et al. .................. 715/500 | 2005/0102612 A1 | 5/2005 | Allan et al. | |
| 2004/0015783 A1 | 1/2004 | Lennon et al. | 2005/0108104 A1 | 5/2005 | Woo | |
| 2004/0024842 A1 | 2/2004 | Witt | 2005/0108624 A1 | 5/2005 | Carrier | |
| 2004/0030991 A1 | 2/2004 | Hepworth et al. | 2005/0114757 A1 | 5/2005 | Sahota et al. | |
| 2004/0039881 A1 | 2/2004 | Shoebridge et al. | 2005/0114764 A1 | 5/2005 | Gudenkauf et al. | |
| 2004/0039990 A1 | 2/2004 | Bakar et al. | 2005/0132043 A1 | 6/2005 | Wang et al. | |
| 2004/0039993 A1 | 2/2004 | Kougiouris et al. | 2005/0138031 A1 | 6/2005 | Wefers | |
| 2004/0044961 A1 | 3/2004 | Pesenson | 2005/0138086 A1 | 6/2005 | Pecht-Seibert | |
| 2004/0044965 A1 | 3/2004 | Toyama et al. | 2005/0149375 A1 | 7/2005 | Wefers | |
| 2004/0046787 A1 | 3/2004 | Henry et al. | 2005/0149726 A1 | 7/2005 | Joshi et al. | |
| 2004/0046789 A1 | 3/2004 | Inanoria | 2005/0159136 A1 | 7/2005 | Rouse et al. | |
| 2004/0054966 A1 | 3/2004 | Busch et al. | 2005/0160398 A1 | 7/2005 | Bjornson et al. | |
| 2004/0059754 A1 | 3/2004 | Barghout et al. | 2005/0171746 A1 | 8/2005 | Thalhammer-Reyero | |
| 2004/0073565 A1 | 4/2004 | Kaufman et al. | 2005/0183006 A1 | 8/2005 | Rivers-Moore et al. | |
| 2004/0073868 A1 | 4/2004 | Easter et al. | 2005/0198086 A1 | 9/2005 | Moore et al. | |
| 2004/0078756 A1 | 4/2004 | Napper et al. | 2005/0198247 A1 | 9/2005 | Perry et al. | |
| 2004/0083426 A1 | 4/2004 | Sahu | 2005/0210263 A1 | 9/2005 | Levas et al. | |
| 2004/0088647 A1 | 5/2004 | Miller et al. | 2005/0223063 A1 | 10/2005 | Chang et al. | |
| 2004/0093596 A1 | 5/2004 | Koyano | 2005/0223320 A1 | 10/2005 | Brintzenhofe et al. | |
| 2004/0107367 A1 | 6/2004 | Kisters | 2005/0234890 A1* | 10/2005 | Enzler et al. ...................... 707/3 | |
| 2004/0117769 A1 | 6/2004 | Lauzon et al. | 2005/0240876 A1 | 10/2005 | Myers et al. | |
| 2004/0123277 A1 | 6/2004 | Schrader et al. | 2005/0257148 A1 | 11/2005 | Goodman et al. | |
| 2004/0128296 A1 | 7/2004 | Krishnamurthy et al. | 2005/0262112 A1 | 11/2005 | Moore | |
| 2004/0139400 A1 | 7/2004 | Allam et al. | 2005/0268217 A1 | 12/2005 | Garrison | |
| 2004/0146199 A1 | 7/2004 | Berkner et al. | 2005/0268222 A1 | 12/2005 | Cheng | |

| | | | | | | |
|---|---|---|---|---|---|---|
| 2006/0010386 | A1 | 1/2006 | Khan | JP | 09251370 | 9/1997 |
| 2006/0020586 | A1 | 1/2006 | Prompt et al. | JP | 09292967 | 11/1997 |
| 2006/0026500 | A1 | 2/2006 | Qa 'Im-maqami | JP | 10011255 | 1/1998 |
| 2006/0026534 | A1 | 2/2006 | Ruthfield et al. | JP | 10097559 | 4/1998 |
| 2006/0031757 | A9 | 2/2006 | Vincent, III | JP | 10171662 | 6/1998 |
| 2006/0036995 | A1 | 2/2006 | Chickles et al. | JP | 10-2207805 | 8/1998 |
| 2006/0041838 | A1 | 2/2006 | Khan | JP | 10207805 | 8/1998 |
| 2006/0059107 | A1 | 3/2006 | Elmore et al. | JP | 10232754 | 9/1998 |
| 2006/0059434 | A1 | 3/2006 | Boss et al. | JP | 10240434 | 9/1998 |
| 2006/0069605 | A1 | 3/2006 | Hatoun | JP | 10260765 | 9/1998 |
| 2006/0075245 | A1 | 4/2006 | Meier | JP | 3191429 | 1/2000 |
| 2006/0085409 | A1 | 4/2006 | Rys et al. | JP | 2000132436 | 5/2000 |
| 2006/0101037 | A1* | 5/2006 | Brill et al. ............ 707/100 | JP | 2002183652 | 6/2002 |
| 2006/0107206 | A1 | 5/2006 | Koskimies | JP | 20020183652 | 6/2002 |
| 2006/0136422 | A1 | 6/2006 | Matveief et al. | JP | 2003173288 | 6/2003 |
| 2006/0143220 | A1 | 6/2006 | Spencer, Jr. | WO | WO 99/24945 | 5/1999 |
| 2006/0155857 | A1 | 7/2006 | Feenan et al. | WO | WO-9924945 | 5/1999 |
| 2006/0161559 | A1 | 7/2006 | Bordawekar et al. | WO | WO 99/56207 | 11/1999 |
| 2006/0161837 | A1 | 7/2006 | Kelkar et al. | WO | WO-9956207 | 11/1999 |
| 2006/0173865 | A1 | 8/2006 | Fong | WO | WO 01/44934 | 6/2001 |
| 2006/0184393 | A1 | 8/2006 | Ewin et al. | WO | WO-0144934 | 6/2001 |
| 2006/0191662 | A1 | 8/2006 | Deibl et al. | WO | WO 0157720 | 9/2006 |
| 2006/0195413 | A1 | 8/2006 | Davis et al. | | | |
| 2006/0203081 | A1 | 9/2006 | Pulitzer | | | |
| 2006/0230363 | A1 | 10/2006 | Rapp | | | |
| 2006/0248468 | A1 | 11/2006 | Constantine et al. | | | |
| 2007/0005611 | A1 | 1/2007 | Takasugi et al. | | | |
| 2007/0036433 | A1 | 2/2007 | Teutsch | | | |
| 2007/0050719 | A1 | 3/2007 | Lui et al. | | | |
| 2007/0061467 | A1 | 3/2007 | Essey | | | |
| 2007/0061706 | A1 | 3/2007 | Cupala | | | |
| 2007/0074106 | A1 | 3/2007 | Ardeleanu | | | |
| 2007/0088554 | A1 | 4/2007 | Harb et al. | | | |
| 2007/0094589 | A1 | 4/2007 | Paoli | | | |
| 2007/0100877 | A1 | 5/2007 | Paoli | | | |
| 2007/0101280 | A1 | 5/2007 | Paoli | | | |
| 2007/0118538 | A1 | 5/2007 | Ahern et al. | | | |
| 2007/0118803 | A1 | 5/2007 | Walker et al. | | | |
| 2007/0130500 | A1 | 6/2007 | Rivers-Moore et al. | | | |
| 2007/0130504 | A1 | 6/2007 | Betancourt et al. | | | |
| 2007/0208769 | A1 | 9/2007 | Boehm et al. | | | |
| 2007/0276768 | A1 | 11/2007 | Pallante | | | |
| 2008/0021916 | A1 | 1/2008 | Schnelle et al. | | | |
| 2008/0027896 | A1 | 1/2008 | Anjur | | | |
| 2008/0040635 | A1 | 2/2008 | Larcheveque | | | |
| 2008/0052287 | A1 | 2/2008 | Stanciu et al. | | | |
| 2008/0126402 | A1 | 5/2008 | Sitchi et al. | | | |
| 2008/0134162 | A1 | 6/2008 | James | | | |
| 2008/0162498 | A1 | 7/2008 | Omoigui | | | |
| 2008/0189335 | A1 | 8/2008 | Sikchi | | | |
| 2008/0222514 | A1 | 9/2008 | Rivers-Moore | | | |
| 2009/0044103 | A1 | 2/2009 | Chalecki et al. | | | |
| 2009/0070411 | A1 | 3/2009 | Chang et al. | | | |
| 2009/0119580 | A1 | 5/2009 | Rohrabaugh et al. | | | |
| 2009/0138389 | A1 | 5/2009 | Barthel | | | |
| 2009/0177961 | A1 | 7/2009 | Fortini et al. | | | |
| 2010/0125778 | A1 | 5/2010 | Kelkar et al. | | | |
| 2010/0229110 | A1 | 9/2010 | Rockey et al. | | | |

FOREIGN PATENT DOCUMENTS

| | | |
|---|---|---|
| EP | 0841615 | 11/1999 |
| EP | 0961197 | 12/1999 |
| EP | 1076290 | 2/2001 |
| EP | 1221661 | 7/2002 |
| JP | 63085960 | 4/1988 |
| JP | 401173140 | 7/1989 |
| JP | 401173140 A | 7/1989 |
| JP | 3191429 | 8/1991 |
| JP | 4225466 | 8/1992 |
| JP | 5314152 | 11/1993 |
| JP | 406014105 | 1/1994 |
| JP | 6139241 | 5/1994 |
| JP | 6180697 | 6/1994 |
| JP | 6180698 | 6/1994 |
| JP | 08263246 | 10/1996 |
| JP | 08263247 | 10/1996 |
| JP | 09016801 | 1/1997 |
| JP | 09134273 | 5/1997 |
| JP | 09190327 | 7/1997 |

OTHER PUBLICATIONS

Laura Acklen & Read Gilgen, "Using Corel Wordperfect 9", 251-284, 424-434, 583-586 (1998).

"A tour of Xmetal" O'Reilly XML.COM 'Online Jul. 14, 1999 XP002230081 retrieved from the internet: <URL:http://www.xml.com/pub/a/SeyboldReport/ip0311025.html> retrieved on Feb. 5, 2003.

"Architecture for a Dynamic Information Area Control" IBM Technical Disclosure Bulletin IBM Corp. New York US vol. 37 No. 10 Jan. 10, 1994. pp. 245-246.

"Netscape Communicator's Collapsible Toolbars" CHI'98 Human Factors in Computing Systems Conference Proceedings Los Angeles CA Apr. 18-23, 1998 pp. 81-86.

Barker et al., "Creating In-Line Objects Within an Integrated Editing Environment," IBM Technical Disclosure Bulletin, vol. 27, No. 5, Oct. 1984, p. 2962.

"Flexible Information Presentation with XML" 1998 The Institution of Electrical Engineers 6 pages.

Berg A., "Naming and Binding: Monikers" Inside OLE, 1995, Chapter 9, pp. 431-490.

"Arbortext Adept 8 Editor Review" O'Reilly XML.COM 'Online! Sep. 22, 1999 XP002230080 retrieved from the Internet <URL:http://www.xml.com/pub/a/1999/09/adept/AdeptRvw.htm> retrieved on Feb. 5, 2003.

"XKvalidator: A Constraint Validator for XML" CIKM '-2 Nov. 4-9, 2002 Copyright 2002 ACM 1-58113-492-4/02/0011 pp. 446-452.

"Designing Valid XML Views" ER 2002 LNCS 2503 2002 Springer-Verlag Berlin Heidelberg 2002 pp. 463-477.

Efficient Management of Multiversion Documents by Object Referencing Proceedings of the 27th VLDB Conference 2001 pp. 291-300.

"Efficient schemes for managing mulitversion XML documents" VLDB Journal (2002) pp. 332-352.

"Storing and Querying Multiversion XML Documents using Durable Node Numbers" IEEE 2002 pp. 232-241.

"XML Document Versioning" SIGMOD Record vol. 30 No. 3 Sep. 2001 pp. 46-53.

"Generic Validation of Structural Content with Parametric Modules" ICFP '01 Sep. 3-5, 2001 Copyright 2001 ACM 1-58113-415-0/01/0009 pp. 98-109.

"Managing Complex Documents Over the WWW: A Case Study for XML" IEEE Transactions on Knowledge and Data Engineering vol. 11 No. 4 Jul./Aug. 1999. pp. 629-938.

Clapp D., "The NeXT Application Kit Part I: Non-Responsive Classes," The NeXT Bible 1990, Chapter 16, pp. 275-293.

Clark James—W3C Editor; "XSL Transformation (XSLT) Verison 1.0" Nov. 16, 1999 W3C (MIT INRIA Kejo) pp. 1-156.

W3C Editor James Clark and Ste; "XML Path Language (XPath) Version 1.0" Nov. 16, 1999 W3C (MIT INRIA Kejo) pp. 1-49.

"From Small Beginnings" Knowledge Management Nov. 2001 pp. 28-30.

"XML Editors: Allegations of Functionality in search of reality" Internet 'Online! 1999 XP002230082 retrieved from the Internet <URL:http://www.ivritype.com/xml/>.

"Photo Shop 5/5.5 WOW! Book" 2000 Peachpit Press pp. 8-17.

Description of Whitehill Composer software product producted by Whitehill Technologies Inc. available at <http://www.xml.com/pub/p/221> accessed on Apr. 8, 2004, two pages.

DiLascia et al., "Sweeper" Microsoft Interactive Developer, vol. 1, No. 1, 1996, 27 pages.

"XML Spy Tops as XML Editor" http://www.eweek.com/article2/0395972404100.asp Nov. 25, 2002 4 pages.

"Agent-based Software Configuration and Deployment" Thesis of the Univeristy of Colorado Online Dec. 31, 1999 retrieved from the Internet on Nov. 7, 2003: <http://www.cs.colorado.edu/users/rickhall/documents/ThesisFinal.pdf> 169 pages.

"Mapping and Displaying Structural Transformations between XML and PDF" DocEng '02 Nov. 8-9, 2002 Copyright 2002 ACM 1-58113-597-7/02/0011 pp. 95-102.

"Tsbiff—tildeslash biff—version 1.2.1" Internet Document [Online] Jun. 1999 URL: http://web.archive.org/web/19990912001527/http://www.tildeslash.com/tsbiff/.

Herzner et al., "CDAM—Compound Document Access and Management. An Object-Oriented Approach" Multimedia Systems Interaction and Applications, 1992, Chapter 3, pp. 17-36.

"Micro-Firewalls for Dynamic Network Security with Distributed Intrusion Detection"; IEEE INternational Symposium on Network Computing and Applications; 2001; pp. 68-79.

"Specifying Runtime Environments and Functionalities of Downloadable Components Under the Sandbox Mode"; International Symposium on Principles of Software Evolution; 2000; pp. 138-142.

"An Efficiently Updatable Index Scheme for Structured Documents" 1998 IEEE pp. 991-996.

"Immediate and Partial Validation Mechanism for the Conflict Resolution of Update Operations in XML Databases" WAIM 2002 LNCS 2419 2002 pp. 387-396 Springer-Verlag Berlin Heidelberg 2002.

Kobayashi et al., "An Update on BTRON-specification OS Development" IEEE 1991, pp. 132-140.

Komatsu N. et al., "A Proposal on Digital Watermark in Document Image Communication and Its Application to Realizing a Signature" Electronics and Communications in Japan Part I: Communications vol. 73 No. 5, May 1990, pp. 22-33.

McCright J.S.; "New Tool Kit to Link Groove with Microsoft Sharepoint" eWeek Enterprise News & Reviews Ziff Davis Media Inc. Jul. 29, 2002.

Musgrave S; "Networking technology—impact and opportunities" Survey and Statistical Computing 1996. Proceedings of the Second ASC International Conference. Sep. 1996. pp. 369-378. London UK.

"Validation with MSXML and XML Schema" Windows Developer Magazine Jan. 2002 pp. 35-38.

"SmartUpdate Developer's Guide" Online Mar. 11, 1999 retrieved from the Internet on Dec. 8, 2000: <http://developer.netscape.com:80/docs/manuals/communicator/jarman/index.htm> 83 pages.

"Netscape Communicator 4.61 for OS/2 Warp" Software 1999 The whole software release & "Netscape—Version 4.6 [en]-010615" Netscape Screenhot Oct. 2, 2002.

"A secure conditional access system using digital signature and encryption" 2003 Digest of Technical Papers. International Conference on Consumer Electronics Jun. 2003 pp. 220-221.

Object Management Group, XML Metadata Interchange (XMI) Specification Version 1.2 Jan. 2002.

"Delphi 5 Developer's Guide" Sams Publishing 1999 Chapter 31 Section: Data Streaming 6 pages.

Peterson B., "Unix Variants," Unix Review, vol. 10, No. 4, Apr. 1992, pp. 29-31.

Pike et al., "Plan 9 from Bell Labs" UKUUG, Summer 1990, 10 pages.

Pike et al., "The Use of Name Spaces in Plan 9," Operating Systems Review vol. 27, No. 2, Apr. 1993, pp. 72-76.

Prevelakis et al., "Sandboxing Applications"; Proceedings of the FREENIX Track; 2001; pp. 119-126.

Rapaport L; "Get more from SharePoint" Transform Magazine vol. 11 No. 3. Mar. 2002 pp. 1315.

"Validating MPEG-21 Encapsulated Functional Metadata" IEEE 2002 pp. 209-212.

Schmid et al., "ProtectingData from Malicious Software"; 18th Annual Computer Security Applications Conference; 2002; pp. 199-208.

Staneck W., "Internal and External Media" Electronic Publishing Unleashed, 1995, Chapter 22, pp. 510-542.

"Store and Organize Related Project Files in a Binder," Getting Results with Microsoft Office, 1990, pp. 109-112.

Sun Q. et al., "A robust and secure media signature scheme for JPEG images" Proceedings of 2002 IEEE Workshop on Multimedia Signal Processing, Dec. 2002, pp. 296-299.

"XFIG Version 3.2 Patchlevel 2 (Jul. 2, 1998) Users Manual (Edition 1.0)" Internet Document [Online] Jul. 2, 1998 XP002229137 Retrieved from the Internet: <URL:http://www.ice.mtu.edu/online_docs/xfig332/> [retrieved on Jan. 28, 2003].

"An Efficient and Flexible Access Control Framework for Java Programs in Mobile Terminals"; 22nd International Conference on Distributed Computing Systems Workshops; 2002; pp. 777-782.

Trupin J., "The Visual Programmer," Microsoft Systems Journal, Apr. 1996, pp. 103-105.

"XML: Not a Silver Bullet But a Great Pipe Wrench" Standardview vol. 6. No. 3 Sep. 1998 pp. 125-132.

"The Open Software Description Format" Online Aug. 13, 1997 retrieved from the Internet on Nov. 7, 2003: <http://www.w3.org/TR/NOTE-OSD> 11 pages.

"Bridging XML-Schema and relational databases. A System for generating and manipulating relational databases using valid XML documents." DocEng '01 Nov. 9-10, 2001 Coppyright 2001 ACM 1-58113-432-0/01/0011 pp. 105-114.

"The Component Object Model" A Technical Overview Oct. 1994 Microsoft Corp. pp. 1-14.

"Managing and Querying Multi-Version XML Data with Update Logging" DocEng '02 Nov. 8-9, 2002 Copyright 2002 ACM 1-58113-594-7/02/0011 pp. 74-81.

Zdonik S., "Object Management System Concepts," ACM, 1984, pp. 13-19.

Leblond et al, "PC Magazine Guide to Quattro Pro for Windows", pp. 9-11, 42-61, Ziff-Davis Press, Copyright 1993 by the LeBlond Group.

Microsoft Visual Basic 5.0 Programmer's Guide 1997; pp. 578-579;Redmond WA 98052-6399.

Excel 97 for Busy People Published by Osborne/Mcgraw-Hill 1997 pp. 48-50.

Atova, "User Reference manual Version 4.4, XML Spy suite 4.4," Atova Ges.m.b.H and Altova, Inc., May 24, 2002, pages cover, copyright page, 1-565.

Altova, Inc., "XML Spy 4.0 Manual," Altova Inc. & Altova GmbH, coyright 1998-2001, Chapters 1, 2, and 6, encompassing pp. 1-17, 18-90, and 343-362.

Altova et al. XML Spy, XML integrated Development Environments, Altova Inc., 2002, pp. 1-18.

Ben-Natan, U.S. Appl. No. 60/203,081, filed May 9, 2000, entitled "Internet platform for creating and supporting communities".

Cybook, Inc.: "Copying the Search Form to Services-based Web Sites" INternet Article, (online) Jul. 26, 2004.*the whole document*.

Excel Developer Tlp (hereinafter "Excel"), "Determining the Data Type of a Cell", May 13, 1998, p. 1 (available at http://jwalk.com/ss//excel/tips/tip62.htm).

Han et al., WebSplitter: A Unified XML Framework for Multi-Device Collaborative Web Browsing, 2000, ACM Conference on Cimputer Supported Cooperative Work, 10 pages.

IBM: Stack Algorithm for Extractin Subtree from Seriallzed Tree, Mar. 1, 1994, TDB-ACC-NONN94033, 3 pages.

Ixia Soft, "Steamlining content creation, retrieval, and publishing on the Web using TEXTML Server and SML Spy 4 Suite in an integrated, Web publishing environment," (Partner's Whitepaper, published on the Web as of Jun. 6, 2002, downlowad pp. 1-16.

Kutay, U.S. Appl. No. 60/209,713, filed Jun. 5, 2000, entitled, "Methods and systems for accessing, organizing presenting and viewing data".

Macromedia, Inc.: "Dreamweaver Technote, Changes in copying and pasting in Dreamweaver 4" Internet Article (online). *the whole document*.
Microsoft Word 2000 (see Screen Shot "About Microsoft Word") Published 1983-1999 and Microsoft Excel 2000 (see Screen Shot "About Microsoft Excel") Published 1988-1999, Three pages.
Moore, U.S. Appl. No. 60/191,662, filed Mar. 23, 2000, entitled "Collection-based presistent digital archives".
Raclo, Dave: "How to create a template that makes it easy for users to "fill in the blanks", without doing any programming" Microsoft Word MVP FAQ Site, (online) Apr. 30, 2004, the whole document.
Cover, XML Forms Architecture, retrieved at << http://xml.coverpages.org/xfa.html>> on Aug. 17, 2006, Coverpages, Jun. 16, 1999.
Raggett, "HTML Tables", retrieved on Aug. 8, 2006, at <<http:www://is-edu.hcmuns.edu.vn/WebLib/books/Web/Tel/html3-tables.html>>, W3C Internet Draft, Jul. 7, 1995, pp. 1-12.
"Webopedia Computer Dictionary" retrieved on May 9, 2006, at <<http://www.pewebopedia.com/TERM/O/OLE.html>>, Jupitermedia Corporation, 2006, pp. 07.
Microsoft Corporation, "Microsoft Computer Dictionary" Microsoft Press, Fifth Edition, p. 149.
"Enter Key", Retrieved from the Internet at http://systems.webopedia.com/TERM/Enter_key.html on Dec. 20, 2006.
"Microsoft Visual Basic 5.0 Programmer's Guide", *Microsoft Press*, (1997),pp. 42-43, 54-58.
"Microsoft Word 2000", Screenshots,(1999),1-5.
Beauchemin, Dave , "Using InfoPath to Create Smart Forms", Retrieved from the Internet at http:/www.microsoft.com/office/infopath/prodinfo/using.mspx on Jan. 21, 2007,(Mar. 27, 2003).
Begun, Andrew , et al., "Support and Troubleshooting for XML Schemas in InfoPath 2003", *Microsoft Office InfoPath 2003 Technical Articles*, Retrieved from the Internet at http://msdn2.microsoft.com/en-us/library/aa168241(office.11,d=printer).aspx on Jan. 21, 2007,(Aug. 2004).
Borland, Russo , "Running Microsoft Word 97", 314-315, 338, 361-362, 390, and 714-719.
Brabrand, et al., "Power Forms Declarative Client-side Form Field Validation", (2002),1-20.
Dubinko, Micah , "XForms and Microsoft InfoPath", Retrieved from the Internet at http://www.xml.com/lpt/a/1311 on Jan. 21, 2007,(Oct. 29, 2003).
Hoffman, Michael , "Architecture of Microsoft Office InfoPath 2003", *Microsoft Office InfoPath 2003 Technical Articles*, Retrieved from the Internet at http://msdn2.microsoft.com/en-us/library/aa219024(office.11,d=printer).aspx on Jan. 21, 2007,(Jun. 2003).
Lehtonen, Miro , et al., "A Dynamic User Interface for Document Assembly", Department of Computer Science, University of Helsinki,(Nov. 2002).
Nelson, Joe , "Client-side Form Validation Using JavaScript", *Developer Advisory*, (Sep. 21, 2001).
Raman, T. V., et al., "XForms 1.0", (Dec. 2001),Section 1-12.2.3 & Appendices A-G.
Rees, Michael J., "Evolving the Browser Towards a Standard User Interface Architecture", School of Information Technology, Bond University, Australia,(2001).
Singh, Darshan , "Microsoft InfoPath 2003 by Example", Retrieved from the Internet at http://www.perfectxml.com/InfoPath.asp on Jan. 21, 2007,(Apr. 20, 2003).
Udell, Jon , "InfoPath and XForms", Retrieved from the Internet at http://webloginfoworld.com/udell/2003/02/26.html,(Feb. 26, 2003).
"Microsoft Word 2000 Screenshots", (2000),11-17.
Xmlspy, "XmlSpy 2004 Enterprise Edition Manual", Altova,(May 17, 2004),1-25, 220-225.
Stylusstudio, "StylusStudio: XPath Tools", 2004-2007, StylusStudio,1-14.
Dodds, "Toward an XPath API", xml.com,(May 7, 2001),1-3.
"Microsoft Word 2000 Screenshots", Word,(2000),1-17.
Anat, Eyal et al., "Integrating and Customizing Hererogeneous E-Commerce Applications", The VLDB Journal—The International Journal on Very Large Data Bases, vol. 10, Issue 1,(Aug. 2001),16-38.

Adams, Susie et al., "BizTalk Unleashed", Sams publishing, 2002, first printing Mar. 2001,1-2, 31-138.
Vasters, Clemens F., "BizTalk Server 2000 A Beginner's Guide", Osborne/McGraw-Hill,(2001),1-2, 359-402.
Halberg, Bruce et al., "Using Microsoft Excel 97", (1997),191-201, 213-219.
Villard, et al., "An Incremental XSLT Transformation Processor for XML Document Manipulation", http://www2002.org/CDROM/refereed/321, Printed on May 18, 2007,(May 2002),25 pages.
Grosso, et al., "XML Fragment Interchange", W3C,(Feb. 2001),1-28.
Altova, et al., "User and Reference Manual Version 4.4", www.xmlspy.com, (May 24, 2007),1-565.
"XForm 1.0", W3C,(Jul. 16, 2001).
Bray, Tim "Extensible Markup Language (XML)", http://www.textuality.com/sgml-erb/WD-xml.html, second named inventor Jean Paoli, third named inventor C.M. Sperberg-McQueen,(Feb. 10, 1998),37 Pages.
Kay, Michael "XSL Transfornmations (XSLT) Version 2.0", http://www.w3.org/TR/2005/WD-xsIt20-20050404, (04/205),1-374.
"Notice of Allowance", U.S. Appl. No. 11/167,514, (Mar. 11, 2009),6 pages.
"Non Final Office Action", U.S. Appl. No. 10/942,528, (Mar. 6, 2009),31 pages.
"Non Final Offfice Action", U.S. Appl. No. 11/170,521, (Jan. 12, 2009),86 pages.
"Foreign Office Action", Application Serial No. 2,412,611, (Feb. 9, 2009),6 pages.
"Foreign Office Action", Application Serial No. 200610003709.2, (Jan. 9, 2009),8 pages.
"EP Office Action", Application Serial No. 06111546.5, (Oct. 15, 2008),5 pages.
"Notice of Re-Examination", Application Serial No. 01813138.7, (Mar. 11, 2009),27 pages.
"Notice of Allowance", U.S. Appl. No. 10/988,718, (Apr. 9, 2009).
"Restriction Requirement", U.S. Appl. No. 11/227,550, (Apr. 2, 2009),8 pages.
"Non Final Office Action", U.S. Appl. No. 10/955,665, (Apr. 2, 2009),19 pages.
"Non Final Office Action", U.S. Appl. No. 10/988,720, (Apr. 2, 2009),19 pages.
"Final Office Action", U.S. Appl. No. 11/203,818, (Apr. 14, 2009),31 pages.
"Final Office Action", U.S. Appl. No. 11/044,106, (Apr. 13, 2009),20 pages.
"Final Office Action", U.S. Appl. No. 11/226,044, (Apr. 20, 2009),24 pages.
"Final Office Action", U.S. Appl. No. 11/056,500, (Apr. 16, 2009),10 pages.
"Final Office Action", U.S. Appl. No. 11/203,937, (May 7, 2009),13 pages.
"Non Final Office Action", U.S. Appl. No. 10/955,666, (May 7, 2009),28 pages.
"Non Final Office Action", U.S. Appl. No. 10/876,433, (Apr. 24, 2009),62 pages.
"Non Final Office Action", U.S. Appl. No. 10/916,692, (Apr. 30, 2009),14 pages.
"HP Blade Sever BH Series Operating System Guide", Hewlett-Packard,(Jul. 2002).
"Non Final Office Action", U.S. Appl. No. 09/599,809, (May 13, 2009).
"Non Final Office Action", U.S. Appl. No. 11/295,178.
"Non Final Office Action", U.S. Appl. No. 10/990,152.
"Final Office Action", U.S. Appl. No. 11/036,910, (Jun. 1, 2009),15 pages.
"Non Final Office Action", U.S. Appl. No. 10/857,689, (Jun. 11, 2009),25 pages.
"Non FInal Office Action", U.S. Appl. No. 11/095,254, (Jun. 8, 2009),21 pages.
"Final Office Action", U.S. Appl. No. 11/234,767, 24 pages.
"Foreign Office Action", Application Serial No. 2002-503702, Final Notice of Rejection,(Jun. 5, 2009).

Kaori, Iwantani et al., "Perfect Manual of Clarisworks 4.0 for Macintosh", 1st Edition, Japan,(07/297),pp. 153-167.

Noriko, Matsushita "Step-up Training of Clarisworks (tabulation), Successful Use of Spreadsheet and Tabulation", Mac People, vol. 4, No. 19,(Oct. 1, 1998),pp. 138-139.

Akihiro, Senda "Word 2000, Conservative- Looking but 'Attentive' New Function", NIKKEI PC 21, vol. 4, No. 8,(Aug. 1, 1999),pp. 115-116.

Yasuji, Fukuhara "Clarisworks, Introduction to Business Document Construction, No. 4, Estimate", NIKKEI MAC, No. 14,(May 17, 1994),pp. 197-204.

Acklen, et al., "Using Corel Wordperfect 9", Que Corporation,,(1998),pp. 251-284, 424-434, 583-585.

"Final Office Action", U.S. Appl. No. 10/976,451 (Jul. 2, 2009), 22 pages.

Reagan, Moore W., et al., "Collection-based persistent digital archives", U.S. Appl. No. 60/191,662, filed Mar. 23, 2000, 133.

"Non-Final Office Action", U.S. Appl. No. 11/227,550, (Aug. 3, 2009),10 pages.

"Notice of Allowance", U.S. Appl. No. 11/203,937, (Aug. 3, 2009),7 pages.

"Foreign Office Action", Application Serial No. 200610051554.X, (Jul. 10, 2009),11 pages.

"Non-Final Office Action", U.S. Appl. No. 11/234,767, (Aug. 12, 2009),24 Pages.

"Final Office Action", U.S. Appl. No. 10/977,198, (Aug. 19, 2009),15 pages.

"Non-Final Office Action", U.S. Appl. No. 10/939,588, (Aug. 27, 2009),28 pages.

"Final Office Action", U.S. Appl. No. 11/170,521, (Sep. 8, 2009),12 pages.

"Final Office Action", U.S. Appl. No. 10/402,640, (Aug. 28, 2009),17 pages.

"Notice of Allowance", U.S. Appl. No. 11/203,937, Supplemental,(Sep. 15, 2009),2 pages.

"Final Office Action", U.S. Appl. No. 10/942,528, (Sep. 17, 2009),27 pages.

"Notice of Allowance", U.S. Appl. No. 10/988,720, (Sep. 17, 2009),18 pages.

"Non-Final Office Action", U.S. Appl. No. 11/044,106, (Sep. 24, 2009),17 pages.

"Notice of Allowance", U.S. Appl. No. 11/203,937, (Aug. 31, 2009),2 pages.

"Non-Final Office Action", U.S. Appl. No. 11/567,149, (Sep. 8, 2009),5 pages.

"Final Office Action", U.S. Appl. No. 10/955,666, (Oct. 14, 2009),24 pages.

"Advisory Action", U.S. Appl. No. 10/942,528, (Oct. 26, 2009),3 pages.

"Non-Final Office Action", U.S. Appl. No. 11/557,931, (Oct. 20, 2009),27 pages.

"Non-Final Office Action", U.S. Appl. No. 10/976,451, (Oct. 29, 2009),14 pages.

Webopedia, "Definition of OLE", Retrieved from: <http://www.webopedia.com/TERM/O/OLE.html>, cited by examiner,(May 16, 1998),3 pages.

Webopedia, "Definition of OpenDoc", Retrieved from: <http://www.webopedia.com/TERM/O/OpenDoc.html>, cited by examiner,(Sep. 18, 1997),3 pages.

Webopedia, "Definition of Network", Retrieved from: <http://www.webopedia.com/TERM/n/network.html>, cited by examiner,(Sep. 1, 1996),2 pages.

"Notice of Allowance", U.S. Appl. No. 10/955,665, (Nov. 3, 2009),8 pages.

"Final Office Action", U.S. Appl. No. 10/916,692, (Nov. 16, 2009), 10 pages.

"Final Office Action", U.S. Appl. No. 11/072,087, (Nov. 16, 2009), 9 pages.

"Final Office Action", U.S. Appl. No. 11/218,149, (Nov. 16, 2009), 18 pages.

"Foreign Office Action", Mexican Patent Application No. PA/a/2006/002493, (Sep. 14, 2009), 5 pages.

"Non-Final Office Action", U.S. Appl. No. 11/036,910, (Nov. 13, 2009), 9 pages.

"Notice of Allowance", U.S. Appl. No. 10/942,528, (Dec. 3, 2009), 8 pages.

"Notice of Allowance", U.S. Appl. No. 11/056,500, (Dec. 2, 2009), 17 pages.

"Notice of Allowance", U.S. Appl. No. 11/095,254, (Nov. 18, 2009), 8 pages.

Van Hoff, Arthur et al., "The Open Software Description Format", Retrieved from: <www.w3.org/TR/NOTE-OSD> on May 18, 2009, (Aug. 13, 1997), 10 pages.

"Architecture for a Dynamic Information Area Control", IBM Technical Disclosure Bulletin, IBM Corp, NY, US vol. 37, No. 10, Jan. 10, 1994,,, pp. 245-246.

"Copying the Search Form to Custom Pages in Windows SharePoint Services-based Web Sites", *CyBOOK, Inc.*, Jul. 26, 2004, Internet Article,(2004), 1 page.

"Excel Developer Tip: Determining the Data Type of a Cell", Retrieved from <http://jwalk.com/ss/excel/tips/tip62.htm>, (May 13, 1998), 1 page.

"Final Office Action", U.S. Appl. No. 11/227,550, (Jan. 19, 2010), 12 pages.

"Final Office Action", U.S. Appl. No. 11/234,767, (Jan. 26, 2010), 23 pages.

"Final Office Action", U.S. Appl. No. 11/295,178, (Dec. 24, 2009), 38 pages.

"Foreign Notice of Allowance", Mexican Application No. PA/a/2005/012067, (Nov. 13, 2009), 3 pages.

"Foreign Office Action", Application Serial No. 200610051544.X, (Dec. 4, 2009), 9 pages.

"Non-Final Office Action", U.S. Appl. No. 10/402,640, (Dec. 30, 2009), 16 pages.

"Non-Final Office Action", U.S. Appl. No. 11/170,521, (Dec. 17, 2009), 11 pages.

"Non-Final Office Action", U.S. Appl. No. 11/218,149, (Jan. 14, 2010), 15 Pages.

"Non-Final Office Action", U.S. Appl. No. 12/021,894, (Dec. 31, 2009), 10 pages.

"Notice of Allowance", U.S. Appl. No. 10/990,152, (Dec. 21, 2009), 6 pages.

"Notice of Allowance", U.S. Appl. No. 11/072,087, (Feb. 23, 2010), 4 pages.

"Notice of Allowance", U.S. Appl. No. 11/872,703, (Jan. 27, 2010), 19 pages.

"OMG XML Metadata Interchange (XMI) Specification", Retrieved from: >http://www.omg.org/cgi-bin/doc?formal/02-01-01.pdf> on Dec. 2, 2009, Version 1.2,(Jan. 2002), 268 pages.

"SmartUpdate Developer's Guide", Retrieved from http://developer.netscapte.com:80/docs/manuals/communicator/jarman/index.htm on Dec. 8, 2000, Netscape Communications Corp,(Mar. 11, 1999), 83 pages.

"Stack Algorithm for Extracting Subtree from Serialized Tree", *IBM Technical Disclosure Bulletin*, TDB-ACC-NO; NN94033, (Mar. 1, 1994), 2 pages.

"Store and Organize Related Project Files in a Binder", Getting results with Microsoft Office,(1990), pp. 109-112.

"Streamlining Content Creation", Ixia Soft Jun. 6, 2002,(Jun. 6, 2002), pp. 1-16.

"Supplemental Notice of Allowance", U.S. Appl. No. 10/955,665, (Dec. 30, 2009), 2 pages.

"Supplemental Notice of Allowance", U.S. Appl. No. 10/955,665, (Feb. 4, 2010), 2 pages.

"Supplemental Notice of Allowance", U.S. Appl. No. 10/955,665, (Nov. 27, 2009), 2 pages.

"Validation with MSXML and XML Schema", *Windows Developer Magazine*, (Jan. 1, 2002), 5 pages.

"Whitehill Composer Software product", Retrieved from www.xml.com/pub/p/221 on Apr. 8, 2004, Whitehills Technologies, Inc., 2 pages.

"XML Forms Architecture (XFA)", Retrieved from http://xml.coverpages.org/xfa.html on Aug. 17, 2006, Cover Pages Technology Reports,,(Jun. 16, 1999), p. 1.

Alschuler, Liora "A Tour of XMetal", Retrieved from: <http://www.xml.com/pub/a/SeyboldReport/ip031102.html> on Feb. 5, 2003, XML.com, Online! XPOO2230081,(Jul. 14, 1999), 3 pages.

Altova, "XML Spy 4.0 Manual", *1998-2001 Altova Inc. & Altova GmbH*, (Sep. 10, 2001), pp. 1-90, 343-362.

Altova, et al., "XML Spy, XML Integrated Development Environments", Altova Inc.,(2002), pp. 1-18.

Au, Irene et al., "Netscape Communicator's Collapsible Toolbars", CHI 98, Human Factors in Computing Systems, Conference Proceedings, LA, CA,(Apr. 18-23, 1998), pp. 81-86.

Barker, et al., "Creating In-Line Objects Within an Integrated Editing Environment", IBM Technical Disclosure Bulletin, vol. 27, No. 5,(Oct. 1984), p. 2962.

Battle, Steven A., et al., "Flexible Information Presentation with XML", *The Institution of Electrical Engineers*, (1998), 6 pages.

Ben-Natan, Ron et al., "Internet Platform for Creating and Supporting Communities", U.S. Appl. No. 60/203,081, filed May 9, 2000, 31 pages.

Berg, A "Naming and Binding: Monikers", *Inside OLE, Chapter 9, Harmony Books*, (1995), pp. 431-490.

Brogden, William "Arbortext Adept 8 Editor Review", Retrieved from: <www.xml.com/pub/a/1999/09/adept/AdeptRvw.htm> on Feb. 5, 2003, O'Reilly XML.COM, Online!,(Sep. 22, 1999), 4 pages.

Chen, Ya B., et al., "Designing Valid XML Views", S. Spaccapietra, S.T. March, and Y. Kambayashi (Eds.): ER 2002, LNCS 2503, Copyright: Springer-Verlag Berlin Heidelberg 2002,, pp. 463-477.

Chen, Yi et al., "XKvalidator: A Constraint Validator for XML" *CIKM '02*, Nov. 4-9, 2002, McLean, VA, USA, Copyright 2002, ACM, ISBN 1-58113-492-4/02/0011,(Nov. 4-9, 2002), pp. 446-452.

Chien, et al., "Efficient Management of Multiversion Documents by Object Referencing", Proceedings of the 27th VLDB Conference,(2001), pp. 291-300.

Chien, Shu-Yao et al., "Efficient Schemes for Managing Multiversion XML Documents", *The VLDB Journal 2002*, (Dec. 19, 2002), pp. 332-353.

Chien, Shu-Yao et al., "Storing and Querying Multiversion XML Documents using Durable Node Numbers", IEEE,(2002), pp. 232-241.

Chien, Shu-Yoa et al., "XML Document Versioning", SIGMOD Record, vol. 30, No. 3,,(Sep. 2001), pp. 46-53.

Chuang, Tyng-Ruey "Generic Validation of Structural Content with Parametric Modules", *ICFP 2001 International Conference on Functional Programming*, vol. 36, No. 10, Available at <http://citeseerx.ist.psu.edu/viewdoc/download?doi=10.1.1.7.6412&rep=rep1&type=pdf>,(Sep. 3, 2001), 12 pages.

Ciancarini, Paolo A., et al., "Managing Complex Documents Over the WWW: A Case Study for XML", *Transactions on Knowledge and Data Engineering*, vol. 11, No. 4, Available at <http://citeseerx.ist.psu.edu/viewdoc/download?doi=10.1.1.18.1679&rep=rep1&type=pdf>,(Apr. 1999), pp. 1-14.

Clapp, D "The NeXT Application Kit Part 1: Non-Responsive Classes", *The NeXT Bible Chapter 16*, (1990), pp. 275-293.

Clark, James "XSL Transformation (XSLT), Version 1.0", Retrieved from: <www.w3.org/TR/1999/REC-xslt19991116> on Oct. 26, 2009, WC3,(Nov. 16, 1999), 57 pages.

Clark, James et al., "XML Path Language (XPath)", Retrieved from: <www.w3.org/TR/1999/RCE-xpath-19991116> on Oct. 26, 2009, Version 1.0,(Nov. 16, 1999), 37 pages.

Clark, Peter "From Small Beginnings", *Knowledge Management*, (Nov. 2001), pp. 28-30.

Cover, Robin "XML Forms Architecture (XFA)", *Cover Pages*. Retrieved from "http://xml.coverpages.org/xfa.html" on Aug. 17, 2006, (Apr. 19, 2000), 4 pages.

Davidow, Ari "XML Editors: Allegations of Functionality in Search of Reality", Retrieved from: <http://www.ivritype.com/xml/> on Feb. 9, 2009, SP002230082,(Oct. 12, 1999), 16 pages.

Dayton, Linnea et al., "Photo Shop 5/5.5 WOW! Book", 2000, *Peachpit Press*, pp. 8-17.

Dilascia, Paul et al., "Sweeper", *Microsoft interactive developer*, vol. 1., No. 1, (1996), pp. 16-52.

Dorward, Sean et al., "Unix Variants", *Unix Review*, vol. 10, No. 4, (Apr. 1992), pp. 29-31.

Dyck, Timothy "XML Spy Tops as XML Editor", *eWeek*, vol. 19, No. 47,, (Nov. 24, 2002), 3 pages.

Halberg, et al., "Using Microsoft Excel 97", Que Corporation,,(1997), pp. 1-9, 18-25, 85-89, 98-101, 106-113, 124-127, 144-147, 190-201, 209-210, 213-227, 581-590, 632-633, 650-655, 712-714.

Han, Richard et al., "Websplitter: A Unified XML Framework for Multi-Device Collaborative Web Browsing", *ACM Conference on Computer Supported Cooperative Work*, (2000), 10 pages.

Hardy, Matthew R., et al., "Mapping and Displaying Structural Transformations between XML and PDF", *Proceedings of the 2002 ACM symposium on Document engineering*, (Nov. 8-9, 2002), pp. 95-102.

Haukeland, Jan-Henrick "Tsbiff-tildeslash biff—Version 1.2.1", http://web.archive.org/web/19990912001527/http://www.tildeslash.com/tsbiff/., (Jun. 1999), 2 pages.

Herzner, Wolfgang et al., "CDAM-Compound Document Access and Management. An Object-Oriented Approach" *ACM SIGOIS Bulletin*, vol. 12, Issue 1, MultiMedia Systems Interaction and Applications, Chapter 3,,(Jul. 1991), 18 pages.

Honkala, Mikko et al., "Multimodal Interaction with XForms", *ICWE '06*, (2006), pp. 201-208.

Hwang, Kai et al., "Micro-Firewalls for Dynamic Network Security with Distributed Intrusion Detection", *IEEE International Symposium on Network Computing and Applications 2001*, (2001), pp. 68-79.

Kaiya, Haruniko et al., "Specifying Runtime Environments and Functionalities of Downloadable Components under the Sandbox Model", *International Symposium on Principles of Software Evolution 2000*, (2000), pp. 138-142.

Kanemoto, Hirotaka et al., "An Efficiently Updatable Index Scheme for Structured Documents", *DEXA '98*, (1998), pp. 991-996.

Kim, Sang-Kyun et al., "Immediate and Partial Validation Mechanism for the Conflict Resolution of Update Operations in XML Databases", *WAIM 2002, LNCS 2419*, 2002, Springer-Verlag Berlin Heidelberg, (2002), pp. 387-396.

Kobayashi, M. et al., "An Update on BTRON-specification OS Development", *Proceedings of the 8thTRON Project Symposium*, 1991, 0-8186-2475-2/91,(1991), pp. 132-140.

Komatsu, Naohisa et al., "A Proposal on Digital Watermark in Document Image Communication and It's Application to Realizing a Signature", *Electronics and Communication in Japan, Part I: Communications*, vol. 73, No. 5, (May 1990), pp. 22-33.

Kutay, Ali et al., "Methods and Systems for Accessing, Organizing, Presenting and Viewing Data", U.S. Appl. No. 60/209,713, Kutay et al., filed Jun. 5, 2000, 345 pages.

Leblond, et al., "PC Magazine Guide to Quattro Pro for Windows", Ziff-Davis Press,(1993), pp. 9-11, 42-61.

Mansfield, Ron "Excel 97 for Busy People", Osborne/McGraw-Hill,,(Jan. 27, 1997), pp. 48-50.

McCright, John S., "New Tool Kit to Link Groove with Microsoft SharePoint", Retrieved from: <http://www.eweek.com/c/a/Enterprise-Applications/New-Tool-Kit-to-Link-Groove-With-Microsoft-SharePoint/> on Dec. 28, 2009, (Jul. 29, 2002), 3 pages.

Musgrave, S "Network Technology—Impact and Opportunities", *Survey and Statistical Computing 1996, Proceedings of the Second ASC International Conference*, London, UK,, (Sep. 1996), pp. 369-378.

Noore, Afzel "A Secure Conditional Access System using Digital Signature and Encryption", *International Conference on Consumer Electronics*, (Jun. 2003), pp. 220-221.

Pike, Rob et al., "Plan 9 From Bell Labs", AT&T Bell Laboratories, UKUUG, Summer 1990,, 10 pages.

Pike, Rob et al., "The Use of Name Spaces in Plan 9", *Operating Systems Review*, vol. 27, No. 2, (Apr. 1993), pp. 72-76.

Prevelakis, Vassilis et al., "Sandboxing Applications", *FREENIX Track: 2001 USENIX Annual Technical Conference*, (2001), pp. 119-126.

Rado, Dave "How to create a template that makes it easy for users to 'fill in the blanks' without doing any programming,", Retrieved from http://word.mvps.org/FAQs/Customization/FillinTheBlanks.htm, (Apr. 2004), pp. 1-2.

Raggett, "HTML Tables", Retrieved from: <http:www.//is-edu.homuns.edu.vn/WebLib/books/Web/Tel/html3-tables.html> on Aug. 6, 2006, W3C Internet Draft,(Jul. 7, 1995), pp. 1-12.

Rapaport, Lowell "Get More From SharePoint", *Transform Magazine*, vol. 11, No. 3, (Mar. 2002), 2 pages.

Rogge, Boris et al., "Validating MPEG-21 Encapsulated Functional Metadata", *IEEE 2002*, ISBN 0-7803-7304-9/02,(2002), pp. 209-212.

Schmid, Mathew et al., "Protecting Data from Malicious Software", *18th Annual Security Applications Conference*, (2002), pp. 199-208.

Staneck, W "Internal and External Media", Electronic Publishing Unleashed, Chapter 22,,(1995), pp. 510-542.

Sun, Q et al., "A Robust and Secure Media Signature Scheme for JPEG Images", Proceeding of 2002 IEEE Workshop on Multimedia Signal Processing,(Dec. 2002), pp. 296-299.

Sutanthavibul, Supoj et al., "XFIG Version 3.2 Patchlevel 2 (Jul. 2, 1998) Users Manual (Edition 1.0)", Retrieved from: <www.ice.mtu.edu/online_docs/sfig332/> on Jan. 28, 2003, Internet Document XP00229137,(Jul. 2, 1998), 60 pages.

Tomimori, Hiroyuki et al., "An Efficient and Flexible Access Control Framework for Java Programs in Mobile Terminals", Proceeding of 22nd Int'l Conference on Distributed Computing Systems Workshops,(2002), pp. 777-782.

Trupin, J "The Visual Programmer", Microsoft Systems Journal,(Apr. 1996), pp. 103-105.

Usdin, Tommie et al., "XML: Not a Silver Bullet, But a Great Pipe Wrench", *Standard View* vol. 6, No. 3, (Sep. 2, 1998), pp. 125-132.

Varlamis, Iraklis et al., "Bridging XML-Schema and relational database. A System for generating and manipulating relational databases using valid XML documents", DocEng 01, ACM 1-58113-432-0/01/0011,(Nov. 9-10, 2001), pp. 105-114.

Williams, Sara et al., "The Component Object Model: A Technical Overview", Microsoft Corp,(Oct. 1994), pp. 1-14.

Wong, Raymond K., et al., "Managing and Querying Multi-Version XML Data with Update Logging", *DocEng '02*, (Nov. 8-9, 2002), 8 pages.

Zdonik, S "Object Management System Concepts", ACM,(1984), pp. 13-19.

"Non-Final Office Action", U.S. Appl. No. 10/916,692, (Apr. 5, 2010), 6 pages.

"Non-Final Office Action", U.S. Appl. No. 11/227,550, (Mar. 10, 2010), 12 pages.

"Notice of Allowance", U.S. Appl. No. 10/939,588, (Mar. 10, 2010), 10 pages.

"Notice of Allowance", U.S. Appl. No. 11/044,106, (Mar. 15, 2010), 7 pages.

"Supplemental Notice of Allowance", U.S. Appl. No. 10/955,665, (Mar. 5, 2010), 2 pages.

"Non-Final Office Action", U.S. Appl. No. 10/976,451, (Apr. 9, 2010),11 pages.

"Supplemental Notice of Allowance", U.S. Appl. No. 11/072,087, (Apr. 19, 2010),2 pages.

"Supplemental Notice of Allowance", U.S. Appl. No. 10/990,152, (Apr. 19, 2010),2 pages.

"Non-Final Office Action", U.S. Appl. No. 10/402,640, (Apr. 30, 2010),4 pages.

"European Search Report", EP Application No. 06111546.5, (Nov. 9, 2006),5 pages.

"Final Office Action", U.S. Appl. No. 10/402,640, (Sep. 10, 2007),16 pages.

"Final Office Action", U.S. Appl. No. 10/955,087, (May 16, 2008),13 pages.

"Final Office Action", U.S. Appl. No. 10/955,666, (Oct. 31, 2008),24 pages.

"Final Office Action", U.S. Appl. No. 10/955,666, (Aug. 30, 2007),19 pages.

"Final Office Action", U.S. Appl. No. 10/976,451, (Jul. 27, 2010),12 pages.

"Final Office Action", U.S. Appl. No. 10/977,198, (Sep. 3, 2008),13 pages.

"Final Office Action", U.S. Appl. No. 10/977,198, (Oct. 11, 2007),10 pages.

"Final Office Action", U.S. Appl. No. 10/988,718, (Jan. 30, 2008),15 pages.

"Final Office Action", U.S. Appl. No. 10/988,718, (Dec. 22, 2008),17 pages.

"Final Office Action", U.S. Appl. No. 10/988,732, (Nov. 13, 2009),33 pages.

"Final Office Action", U.S. Appl. No. 10/988,732, (Dec. 10, 2008),29 pages.

"Final Office Action", U.S. Appl. No. 11/012,472, (Mar. 23, 2010),10 pages.

"Final Office Action", U.S. Appl. No. 11/227,550, (Aug. 19, 2010),12 pages.

"Final Office Action", U.S. Appl. No. 11/295,178, (Jul. 30, 2010),43 pages.

"Final Office Action", U.S. Appl. No. 11/567,140, (Aug. 19, 2010),10 pages.

"Foreign Office Action", Chinese Application No. 200610051554.X, (Jun. 25, 2010),10 pages.

"Foreign Office Action", EP Application No. 01935325.9, (Jul. 20, 2010),6 pages.

"Foreign Office Action", Japanese Application No. 2002-530701, (Aug. 10, 2010),11 pages.

"Issue Notification", U.S. Appl. No. 10/955,087, (Mar. 18, 2009),1 page.

"Issue Notification", U.S. Appl. No. 10/988,718, (Aug. 12, 2009),1 page.

"Issue Notification", U.S. Appl. No. 11/095,254, (Feb. 10, 2010),1 page.

"Issue Notification", U.S. Appl. No. 11/276,585, (Jan. 21, 2009),1 page.

"Lotus Notes Release 5, Step by Step", *Lotus Development Corporation*, (1999),224 pages.

"Netscape Window", *Netscape Screenshot*, (Oct. 2, 2002),1 page.

"Non Final Office Action", U.S. Appl. No. 10/402,640, (Oct. 6, 2006),15 pages.

"Non Final Office Action", U.S. Appl. No. 10/402,640, (Feb. 12, 2008),16 pages.

"Non Final Office Action", U.S. Appl. No. 10/402,640, (Apr. 25, 2007),16 pages.

"Non Final Office Action", U.S. Appl. No. 10/402,640, (Sep. 8, 2008),16 pages.

"Non Final Office Action", U.S. Appl. No. 10/955,087, (Nov. 19, 2007),22 pages.

"Non Final Office Action", U.S. Appl. No. 10/955,666, (Dec. 26, 2006),20 pages.

"Non Final Office Action", U.S. Appl. No. 10/955,666, (Feb. 4, 2008),20 pages.

"Non Final Office Action", U.S. Appl. No. 10/977,198, (Jan. 10, 2008),10 pages.

"Non Final Office Action", U.S. Appl. No. 10/977,198, (Mar. 9, 2007),9 pages.

"Non Final Office Action", U.S. Appl. No. 10/988,718, (Jan. 25, 2007),13 pages.

"Non Final Office Action", U.S. Appl. No. 10/988,718, (Jul. 21, 2008),18 pages.

"Non Final Office Action", U.S. Appl. No. 10/988,718, (Jul. 26, 2007),21 pages.

"Non-Final Office Action", U.S. Appl. No. 10/854,961, (Nov. 15, 2006),21 pages.

"Non-Final Office Action", U.S. Appl. No. 10/955,665, (Sep. 11, 2008),16 pages.

"Non-Final Office Action", U.S. Appl. No. 10/988,732, (Apr. 1, 2008),27 pages.

"Non-Final Office Action", U.S. Appl. No. 10/988,732, (May 26, 2010),36 pages.

"Non-Final Office Action", U.S. Appl. No. 10/988,732, (Jun. 11, 2009),30 pages.

"Non-Final Office Action", U.S. Appl. No. 11/012,472, (Oct. 6, 2009),8 pages.

"Non-Final Office Action", U.S. Appl. No. 11/012,472, (Jul. 1, 2010),9 pages.

"Non-Final Office Action", U.S. Appl. No. 11/036,910, (Aug. 19, 2010),8 pages.

"Notice of Allowance", U.S. Appl. No. 10/854,961, (Jun. 14, 2007),12 pages.
"Notice of Allowance", U.S. Appl. No. 10/955,087, (Dec. 11, 2008),10 pages.
"Restriction Requirement", U.S. Appl. No. 10/402,640, (Aug. 29, 2006),5 pages.
"Restriction Requirement", U.S. Appl. No. 11/012,472, (Jun. 9, 2009),7 pages.
Burch, Barbara "Notes R5 Technical Overview", Retrieved from:<http://www.ibm.com/developerworks/lotus/library/1s-Notes_R5_Technical_Overview> on Aug. 13, 2010, (Apr. 1, 1999),14 pages.
Esposito, Dino "Cutting Edge No. 8", *Microsoft Internet Developer*, (Jan. 18, 2000),13 pages.
Howlett, Scott "A New Function for SQL Server 2000", *MSDN Magazine*, No. 1, (Apr. 18, 2000),11 pages.
"Final Office Action", U.S. Appl. No. 11/036,910, (May 26, 2010), 9 pages.
"Final Office Action", U.S. Appl. No. 11/170,521, (Jun. 29, 2010), 13 pages.
"Final Office Action", U.S. Appl. No. 11/218,149, (May 19, 2010), 17 pages.
"Foreign Office Action", Australian Patent Application No. 2006200285, (May 20, 2010), 2 pages.
"Foreign Office Action", European Patent Application No. 01939368.5, (Feb. 25, 2010), 3 pages.
"Foreign Office Action", Russian Application No. 2006103267, (Apr. 20, 2010), 10 pages.
"Foreign Office Action", Russian Application No. 2006105526, (Apr. 15, 2010), 10 pages.
"Non-Final Office Action", U.S. Appl. No. 11/295,178, (May 26, 2010), 45 pages.
"Non-Final Office Action", U.S. Appl. No. 11/567,140, (May 18, 2010), 8 pages.
"Notice of Allowance", U.S. Appl. No. 10/402,640, (Jun. 15, 2010), 6 pages.
"Notice of Allowance", U.S. Appl. No. 10/916,692, (Jun. 14, 2010), 6 pages.
"Notice of Allowance", U.S. Appl. No. 11/557,931, (May 5, 2010), 7 pages.
"Notice of Allowance", U.S. Appl. No. 11/872,703, (May 14, 2010), 18 pages.
"Supplemental Notice of Allowance", U.S. Appl. No. 11/044,106, (May 13, 2010), 6 pages.
"Supplemental Notice of Allowance", U.S. Appl. No. 11/044,106, (May 19, 2010), 5 pages.
"Advisory Action", U.S. Appl. No. 10/898,657, (Mar. 25, 2008), 3 pages.
"Final Office Action", U.S. Appl. No. 09/599,086, (Mar. 6, 2008), 47 pages.
"Final Office Action", U.S. Appl. No. 09/599,086, (May 10, 2007), 41 pages.
"Final Office Action", U.S. Appl. No. 09/599,086, (May 25, 2004), 23 pages.
"Final Office Action", U.S. Appl. No. 09/599,086, (Jul. 5, 2006), 34 pages.
"Final Office Action", U.S. Appl. No. 09/599,086, (Aug. 8, 2005), 27 pages.
"Final Office Action", U.S. Appl. No. 09/599,299, (Apr. 20, 2004), 23 pages.
"Final Office Action", U.S. Appl. No. 09/599,812, (Aug. 12, 2003), 38 pages.
"Final Office Action", U.S. Appl. No. 10/723,188, (Jan. 9, 2009), 20 pages.
"Final Office Action", U.S. Appl. No. 10/723,863, (Sep. 19, 2007), 34 Pages.
"Final Office Action", U.S. Appl. No. 10/846,428, (Mar. 3, 2008), 23 pages.
"Final Office Action", U.S. Appl. No. 10/897,647, (Mar. 6, 2008), 25 pages.
"Final Office Action", U.S. Appl. No. 10/897,647, (Jul. 14, 2009), 36 pages.
"Final Office Action", U.S. Appl. No. 10/898,656, (Nov. 15, 2007), 16 pages.
"Final Office Action", U.S. Appl. No. 10/898,657, (Jan. 3, 2008), 21 pages.
"Foreign Decision of Grant", Russian Application No. 2006103267, (Aug. 13, 2010), 18 pages.
"Foreign Office Action", Canadian Application No. 2408313, (Oct. 26, 2010), 5 pages.
"Foreign Office Action", Canadian Application No. 2412611, (Oct. 26, 2010), 2 pages.
"Foreign Office Action", European Patent Application No. 01939034.3, (Nov. 5, 2007), 3 pages.
"Foreign Office Action", Russian Application No. 2006105526, (Aug. 24, 2010), 5 pages.
"Manual of Patent Office Practice", *Computer-Implemented Inventions, Chapter 16.09.02, Data Structures*, (Oct. 2010), 3 pages.
"Non Final Office Action", U.S. Appl. No. 09/599,086, (Jan. 30, 2006), 33 pages.
"Non Final Office Action", U.S. Appl. No. 09/599,086, (Oct. 28, 2003), 21 pages.
"Non Final Office Action", U.S. Appl. No. 09/599,086, (Oct. 31, 2007), 48 pages.
"Non Final Office Action", U.S. Appl. No. 09/599,086, (Nov. 13, 2006), 33 pages.
"Non Final Office Action", U.S. Appl. No. 09/599,086, (Nov. 14, 2008), 55 pages.
"Non Final Office Action", U.S. Appl. No. 09/599,086, (Mar. 3, 2005), 25 pages.
"Non Final Office Action", U.S. Appl. No. 10/897,647, (Nov. 14, 2008), 28 pages.
"Non Final Office Action", U.S. Appl. No. 10/897,647, (Sep. 6, 2007), 21 pages.
"Non Final Office Action", U.S. Appl. No. 10/898,656, (Apr. 18, 2008), 17 pages.
"Non Final Office Action", U.S. Appl. No. 10/898,656, (Jul. 13, 2007), 13 pages.
"Non Final Office Action", U.S. Appl. No. 10/898,657, (Jul. 18, 2007), 18 pages.
"Non Final Office Action", U.S. Appl. No. 10/898,657, (Sep. 8, 2008), 24 pages.
"Non-Final Office Action", U.S. Appl. No. 09/599,299, (Oct. 28, 2003), 32 pages.
"Non-Final Office Action", U.S. Appl. No. 09/599,299, (Aug. 12, 2004), 12 pages.
"Non-Final Office Action", U.S. Appl. No. 09/599,812, (Feb. 27, 2003), 20 pages.
"Non-Final Office Action", U.S. Appl. No. 09/599,812, (Feb. 5, 2004), 35 pages.
"Non-Final Office Action", U.S. Appl. No. 10/723,863, (Feb. 8, 2007), 30 Pages.
"Non-Final Office Action", U.S. Appl. No. 10/723,863, (Aug. 23, 2006), 16 Pages.
"Non-Final Office Action", U.S. Appl. No. 10/723,863, (Nov. 6, 2007), 7 Pages.
"Non-Final Office Action", U.S. Appl. No. 10/846,428, (Oct. 15, 2008), 23 pages.
"Non-Final Office Action", U.S. Appl. No. 10/846,428, (Jul. 19, 2007), 19 pages.
"Non-Final Office Action", U.S. Appl. No. 10/976,451, (Nov. 10, 2010), 9 pages.
"Non-Final Office Action", U.S. Appl. No. 11/218,149, (Sep. 20, 2010), 15 pages.
"Non-Final Office Action", U.S. Appl. No. 12/061,613, (Sep. 28, 2010), 9 pages.
"Notice of Allowance", U.S. Appl. No. 09/599,086, (Aug. 17, 2009), 59 pages.
"Notice of Allowance", U.S. Appl. No. 09/599,299, (Nov. 30, 2004), 7 pages.
"Notice of Allowance", U.S. Appl. No. 09/599,812, (Aug. 3, 2004), 12 pages.
"Notice of Allowance", U.S. Appl. No. 10/723,863, (Jun. 30, 2008), 9 Pages.

"Notice of Allowance", U.S. Appl. No. 10/846,428, (Apr. 29, 2009), 10 pages.
"Notice of Allowance", U.S. Appl. No. 10/897,647, (Jan. 19, 2010), 13 pages.
"Notice of Allowance", U.S. Appl. No. 10/898,656, (Jan. 2, 2009), 9 pages.
"Notice of Allowance", U.S. Appl. No. 10/898,657, (Jun. 11, 2009), 20 pages.
"Notice of Allowance", U.S. Appl. No. 12/021,894, (Oct. 29, 2010), 9 pages.
"PCT Search Report", PCT Application No. PCT/US01/15581, (Jan. 29, 2003), 3 pages.
Sato, T. et al., "XFIG Version 3.2 Patchlevel 2 Users Manual Edition 1.0", Available at http://tinf2.vub.ac.be/~dvermeir/manuals/xfig/lib/X11/xfig/html/index.html, (Jul. 2, 1998), 37 pages.
"About Microsoft Word", Microsoft Word 2000, published 1983-1999, and Microsoft Excel 2000 (see Screen Shot "About Microsoft Excel") Published 1988-1999,3 pages.
"Advisory Action", U.S. Appl. No. 10/185,048, (Jun. 20, 2006),3 Pages.
"Advisory Action", U.S. Appl. No. 10/185,048, (Sep. 16, 2005),3 Pages.
"Advisory Action", U.S. Appl. No. 10/632,437, (Aug. 23, 2006),3 pages.
"Advisory Action", U.S. Appl. No. 10/916,692, (Dec. 10, 2008),3 Pages.
"Applicants' Statement Regarding a Non-Public Use", (May 31, 2006),1 page.
"Copying the Search Form to Services-based Web Sites", *Cybook, INC., The whole document*, (Jul. 26, 2004),1 page.
"EP Search Report", EP Application No. 00306806, (Jul. 16, 2003),3 pages.
"EP Search Report", EP Application No. 97307138, (Mar. 21, 2003),3 pages.
"Final Office Action", U.S. Appl. No. 10/178,291, (Dec. 19, 2005),21 pages.
"Final Office Action", U.S. Appl. No. 10/185,048, (Mar. 13, 2006), 14 Pages.
"Final Office Action", U.S. Appl. No. 10/185,048, (Jun. 3, 2005), 14 Pages.
"Final Office Action", U.S. Appl. No. 10/632,437, (Jan. 25, 2008),25 pages.
"Final Office Action", U.S. Appl. No. 10/632,437, (Jun. 1, 2006),21 pages.
"Final Office Action", U.S. Appl. No. 10/781,586, (Aug. 9, 2007),20 pages.
"Final Office Action", U.S. Appl. No. 10/876,418, (May 22, 2008), 14 pages.
"Final Office Action", U.S. Appl. No. 10/916,692, (Oct. 2, 2008), 10 Pages.
"Final Office Action", U.S. Appl. No. 11/095,254, (Dec. 22, 2008),9 pages.
"Foreign Decision of Grant", Russian Application No. 2006105526, (Nov. 8, 2010), 16 pages.
"Microsoft Computer Dictionary 5th Edition", Entry for "Stack," Microsoft Press, ISBN 0-7356-1495-4, (May 1, 2002),p. 495.
"Non Final Office Action", U.S. Appl. No. 09/599,806, (Mar. 12, 2003),7 pages.
"Non Final Office Action", U.S. Appl. No. 09/599,806, (Aug. 17, 2004),5 pages.
"Non Final Office Action", U.S. Appl. No. 10/178,291, (Nov. 26, 2004),21 pages.
"Non Final Office Action", U.S. Appl. No. 10/178,291, (Apr. 29, 2004), 14 pages.
"Non Final Office Action", U.S. Appl. No. 10/178,291, (Jun. 27, 2005),22 pages.
"Non Final Office Action", U.S. Appl. No. 10/395,505, (Sep. 11, 2006),8 pages.
"Non Final Office Action", U.S. Appl. No. 10/632,437, (Dec. 16, 2005),22 pages.
"Non Final Office Action", U.S. Appl. No. 10/632,437, (Jul. 26, 2007), 19 pages.
"Non Final Office Action", U.S. Appl. No. 10/632,437, (Sep. 10, 2008),28 pages.
"Non Final Office Action", U.S. Appl. No. 10/770,240, (May 1, 2008),30 pages.
"Non Final Office Action", U.S. Appl. No. 10/770,240, (Aug. 24, 2004),25 pages.
"Non-Final Office Action", U.S. Appl. No. 10/185,048, (Dec. 8, 2004), 14 Pages.
"Non-Final Office Action", U.S. Appl. No. 10/610,504, (Mar. 9, 2006), 12 Pages.
"Non-Final Office Action", U.S. Appl. No. 10/781,586, (Oct. 20, 2006),21 pages.
"Non-Final Office Action", U.S. Appl. No. 10/871,586, (Jan. 9, 2008),22 pages.
"Non-Final Office Action", U.S. Appl. No. 10/876,418, (Sep. 13, 2007), 14 pages.
"Non-Final Office Action", U.S. Appl. No. 10/916,692, (Apr. 1, 2008),9 Pages.
"Non-Final Office Action", U.S. Appl. No. 11/095,254, (Apr. 17, 2008),8 pages.
"Non-Final Office Action", U.S. Appl. No. 11/234,767, (Nov. 26, 2010),28 pages.
"Notice of Allowance", U.S. Appl. No. 09/599,806, (Jan. 21, 2005),9 pages.
"Notice of Allowance", U.S. Appl. No. 10/178,291, (Feb. 6, 2006),7 pages.
"Notice of Allowance", U.S. Appl. No. 10/395,505, (Oct. 4, 2006),8 pages.
"Notice of Allowance", U.S. Appl. No. 10/610,504, (Sep. 6, 2006),4 Pages.
"Notice of Allowance", U.S. Appl. No. 10/632,437, (May 21, 2009),15 pages.
"Notice of Allowance", U.S. Appl. No. 10/781,586, (May 9, 2008),6 pages.
"Notice of Allowance", U.S. Appl. No. 10/876,418, (12/31/08),8 pages.
"OLE Open Doc and Network", Retrieved from http://www.pcwebopedia.com on May 9, 2006, Webopedia entries,(May 16, 1998),7 pages.
"PCT Search Report", PCT Application No. PCT/IB98/01392, (Apr. 9, 1999),3 pages.
"PCT Search Report", PCT Application No. PCT/IB99/02003, (Nov. 28, 2000),3 pages.
"PCT Search Report", PCT Application No. PCT/US99/09620, (Sep. 22, 1999),3 pages.
"Restriction Requirement", U.S. Appl. No. 09/599,806, (Mar. 3, 2003),5 pages.
"Restriction Requirement", U.S. Appl. No. 10/770,240, (Jan. 26, 2009),7 pages.
"Restriction Requirement", U.S. Appl. No. 10/781,586, (Jun. 26, 2006),5 pages.
"Restriction Requirement", U.S. Appl. No. 11/095,254, (Nov. 1, 2007),8 pages.
"Supplemental Notice of Allowance", U.S. Appl. No. 10/781,586, (Jul. 18, 2008),3 pages.
"Supplemental Notice of Allowance", U.S. Appl. No. 10/781,586, (Jun. 4, 2008),2 pages.
Asche, Ruediger R., "Multithreading for Rookies", Microsoft Developer Network Technology Group, Retrieved Apr. 17, 2002 from http://msdn.microsoft.com/library/en-us/dndllpro/html/msdn_threads.asp?frame=true, (Sep. 24, 1993),13 pages.
Baldwin, J F., et al., "A Mass Assignment Based ID3 Algorithm for Decision Introduction", *International Journal of Intelligent Systems*, vol. 12, No. 7, (1997),pp. 523-548.
Cloete, I et al., "CID3: An Extension of ID3 for Attributes with Ordered Domains", *South African Computer Journal*, vol. 4, (1991),pp. 10-16.
Kath, Randy "Managing Virtual Memory in Win32", Microsoft Developer Network Technology Group, Retrieved Apr. 17, 2002 from http://msdn.microsoft.comilibrary/en-us/dngenlib/html/msdn_virtmm.asp?frame=true, (Jan. 20, 1993),9 pages.

Mehta, Manish et al., "SLIQ: A Fast Scalable Classifier for Data Mining", available at <<http://www.dbis.informatik.hu-berlin.de/dbisold/lehre/WS0405/KDD/paper/MAR96.pdf>>, (Mar. 1996),15 Pages.

Sebastiani, F "A Tutorial on Automated Text Categorisation", In Analia Amandi and Ricardo Zunino, editors, Proceedings of ASAI-99, 1st Argentinean Symposium on Artificial Intelligence, Buenos Aires, AR, (1999),Pages 7-35.

Zaki, Mohammed J., et al., "Parallel Classification for Data Mining on Shared-Memory Multiprocessors", ACM, (Mar. 1999),pp. 1-8.

"Foreign Office Action", Japanese Application 2002-504575, (Dec. 14, 2010), 4 pages.

"Non-Final Office Action", U.S. Appl. No. 11/234,767, (Nov. 26, 2010), 28 pages.

"Non-Final Office Action", U.S. Appl. No. 12/028,651, (Jan. 3, 2011), 16 pages.

"Notice of Allowance", U.S. Appl. No. 11/036,910, (Dec. 7, 2010), 7 pages.

"Notice of Allowance", U.S. Appl. No. 11/218,149, (Feb. 11, 2011), 7 pages.

"Notice of Allowance", U.S. Appl. No. 11/931,730, (Feb. 2, 2011), 7 pages.

"Supplemental Notice of Allowance", U.S. Appl. No. 11/036,910, (Jan. 5, 2011), 2 pages.

"Supplemental Notice of Allowance", U.S. Appl. No. 12/021,894, (Jan. 12, 2011), 6 pages.

"Supplemental Notice of Allowance", U.S. Appl. No. 12/021,894, (Feb. 8, 2011), 6 pages.

"Mott Porous Metal. The Most Reliable Means of Restricting Gas Flow", Mott Corporation Webpage, retrieved from <<http://www.mottcorp.com/industry/oem/oem_flowres.htm>> on Aug. 23, 2004, 4 pages.

"Final Office Action", U.S. Appl. No. 11/234,767, (Mar. 10, 2011),28 pages.

"Non Final Office Action", U.S. Appl. No. 11/567,140, (Feb. 18, 2011),8 pages.

"Non-Final Office Action", U.S. Appl. No. 11/927,296, (Mar. 4, 2011), 19 pages.

"Supplemental Notice of Allowance", U.S. Appl. No. 11/931,730, (Mar. 2, 2011),2 pages.

* cited by examiner

Electronic Form's Template

File  Edit  View  Insert  Format  Tools  Table  Help         Type a question for help 118       ACME TECHNICAL COLLEGE
          Class Registration Form 202 — Student Name:
204 — Student ID No.:

206 — Department:                                  ▼ — 210

208 — Class:                                       ▼ — 212

Electronic Form

File  Edit  View  Insert  Format  Tools  Table  Help        Type a question for help

ACME TECHNICAL COLLEGE
Class Registration Form

202 — Student Name: Grace E. Jorgens
204 — Student ID No.: 2011001

206 — Department:                                          ▼ — 210
            402 → Anthropology
                  Astronomy
208 — Class:        Computer Science                       ▼ — 212
            404 → Mathmatics
                  Science
                  Sociology

Fig. 4

QUERY TO AN ELECTRONIC FORM

TECHNICAL FIELD

This invention relates to queries for electronic forms.

BACKGROUND

Electronic forms often access data from data sources through data connections. These data sources persist data, such as a text file with a list of names, a production database storing numbers, and the like. Electronic forms may communicate with these data sources through data connections to make editing the electronic form more scalable, maintainable, easy to use, or full-featured.

For example, data connections generally permit an electronic form to provide information to a user to aid the user in editing the form. In some cases data connections are enabled through connection to a data source over a communications network, such as the Internet. Assume, for instance, that a user is attempting to register for college classes using an electronic form. It may be easier for a user to complete the form if the form is able to respond to queries initiated by the user with data retrieved from a data source. The form may have, for example, a field for entry of a department at the college. The user might know and be able to enter the name of the desired department. But if the user does not know it or does not want to have to type it in, the user may find it easier to select a department from a provided list of departments. The user may initiate a query for this list, such as by clicking on a dropdown list or a button on the form. In response, the form may connect to a data source having this list, like a registration department's computer at the college, and provide this list to the user.

In some situations, however, an electronic form may not have access to—or a user may not want the form to communicate with—a data source. For example, the user's computer may not have access to a communication network (e.g., the Internet) or the data source may be inaccessible because of a failure of the user's computer or a network's server. In either case, when an electronic form does not connect to a data source, the electronic form's performance may degrade. The form may fail to open without access to a data source. Or, if the form opens it may give an error message if the user initiates a query that the form cannot answer without connecting to the data source.

SUMMARY

System(s) and/or method(s) ("tools") are described that enable an electronic form to provide data external to the electronic form in response to a query while not connected to the original source of that data.

The tools may also, in one embodiment, receive and store data from a data source when it is accessed and associate that data with an electronic form, a user, a data adapter for the data source, and a query.

The tools may, in another embodiment, provide data in response to a query made to an electronic form if that query has previously been made to the electronic form.

BRIEF DESCRIPTION OF THE DRAWINGS

FIG. 2 illustrates a screen shot of an exemplary electronic form template.
FIG. 4 illustrates a screen shot of an exemplary instance of the electronic form template of FIG. 2 with a dropdown list of college departments.

The same numbers are used throughout the disclosure and figures to reference like components and features.

DETAILED DESCRIPTION

Overview

The following disclosure describes tools enabling an electronic form to provide data external to the electronic form in response to a query while disconnected from or offline with respect to a data source from which the data originated.

The tools may, in some cases, retrieve the data from another source, such as a locally accessible source, in which the data is cached. The data may be cached in response to a prior and similar or identical query originating from another instance of the electronic form. Alternatively or conjunctively, the data may be cached in response to a prior and similar or identical query originating from the same instance of the electronic form.

In one embodiment, for instance, the tools receive data from the data's original data source in response to a user-initiated query, and store that data for use when the same or similar user-initiated query is performed but the original data source is not accessible. The tools record and store this data and associate it with the electronic form, the version of the electronic form, the user that made the query, a data adapter of the data source, and the query itself. The tools may also, in this and other ways described herein, learn what data a user or group of users has historically requested. In so doing, the tools may build a history of queries and data provided in response to these queries. With this bank of information, new instances of the electronic forms may be used while offline with respect the original data sources of this bank of information. A frequent user may, for instance, open a new instance of an electronic form that he has used many times, and, based on his history with the electronic form, again be provided with information he was previously provided.

For example, if this user is a salesman that often uses a purchase order form for tires and sells to tire stores in Nebraska, the form may provide, without access to the original data sources, cities in Nebraska, names of all the tire stores he has sold to, prices for various types of tires he has sold, and the like. This information is useful to the salesman when he edits a new purchase order and is offline with respect to the form's original data sources.

Exemplary Operating Environment

Before describing the tools in detail, the following discussion of an exemplary operating environment is provided to assist the reader in understanding where and how the tools may be employed. The description provided below constitutes but one example and is not intended to limit application of the tools to any one particular operating environment.

Figure 1:
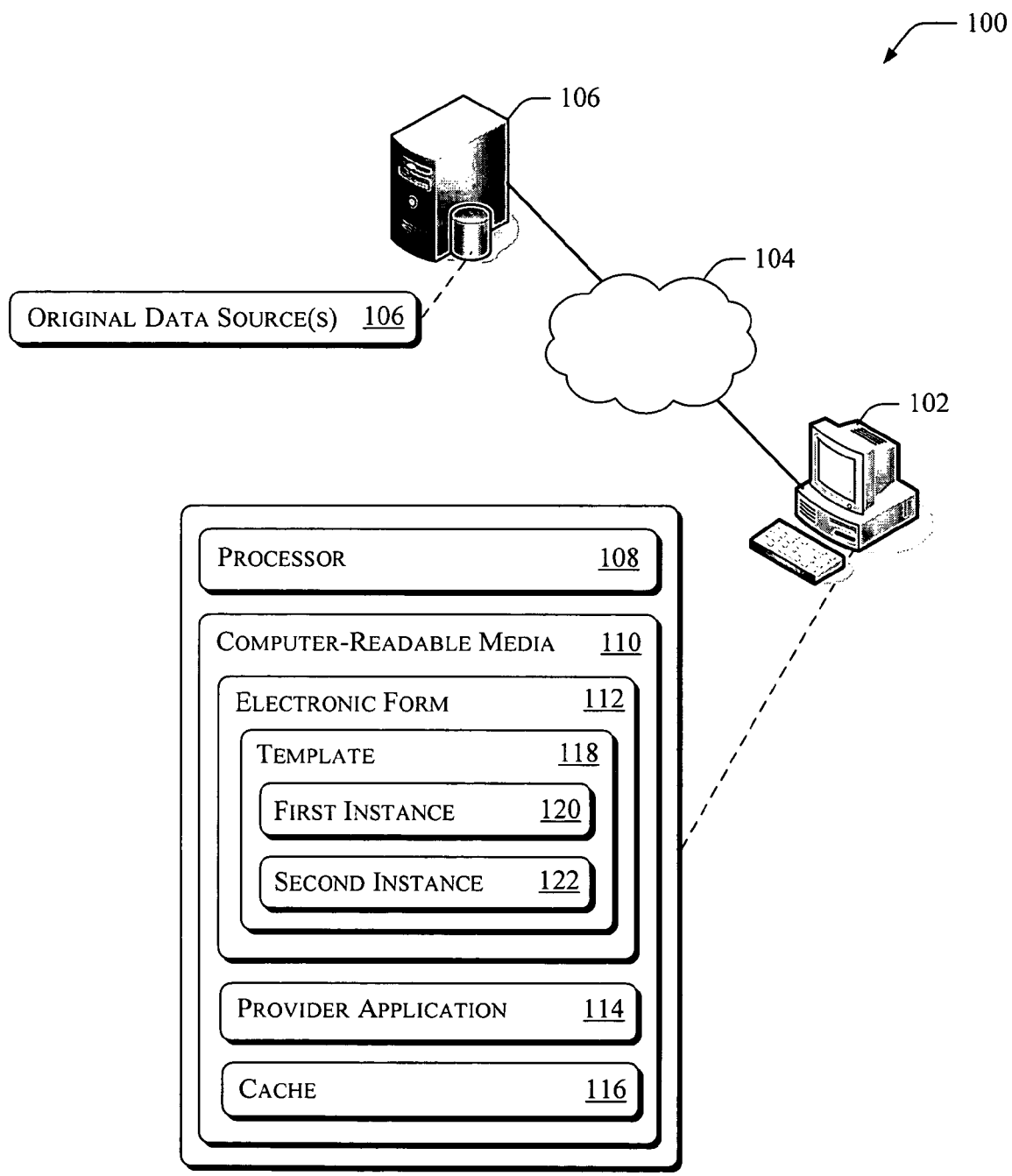
FIG. 1 illustrates an exemplary operating environment.

FIG. 1 illustrates one such operating environment generally at 100 comprising a computer 102, a network 104, and original data source(s) 106. The network may be an intranet, the Internet, or some communication element capable of becoming inaccessible or unavailable (e.g., by the Internet connection failing, a network server failing to provide access to the original data sources, or a user's password to access a local original data source being invalid). The computer is shown comprising a processor 108 and computer-readable media 110. The processor is capable of accessing and/or executing the computer-readable media.

The computer-readable media comprises an electronic form 112, provider application 114, and a cache 116. The provider application is capable of enabling electronic form 112 to provide, or may itself provide, data originally from original data source 106 in response to a user-initiate query while offline with respect to the original data source. The electronic form is shown comprising a template 118 and two instances, first instance 120 and second instance 122. The instances may be associated with the template and/or the electronic form. Each instance represents the electronic form or its template after either have been opened or after editing of either by a user.

Exemplary Electronic Form

An example electronic form is described below. This example form is provided to aid the reader in understanding how the tools may enable electronic forms to provide data external to the electronic form in response to a query while offline with respect to the data's original source. Using this form for context, a reader may more easily understand the tools set forth below. This exemplary form and its explanation are an example only and are not intended to limit the scope or applicability of the tools.

FIG. 2 shows a screen shot 200 with an example of template 118. This particular template is a blank or default version of electronic form 112. The template shows a rendering of the electronic form having a title, "Acme Technical College, Class Registration Form" and various controls. A user may edit these controls to enter his or her name and college identification through name data-entry field 202 and identification data-entry field 204. The user may also register for a class by entering or selecting a department at department control 206 and a class in that department at class control 208.

When the user interacts with this electronic form (such as by opening it or making an edit), he interacts with an instance of the electronic form, which he may modify. If the user enters her name and student identification, the computer or electronic form records these edits into an instance of the electronic form, here an example of first instance 120 of FIG. 1.

Associating Data with an Electronic Form

The following discussion describes exemplary ways in which the tools associate data with an electronic form to enable the electronic form to provide data external to the electronic form in response to a user-initiated query while offline with respect the data's original source.

Figure 3:
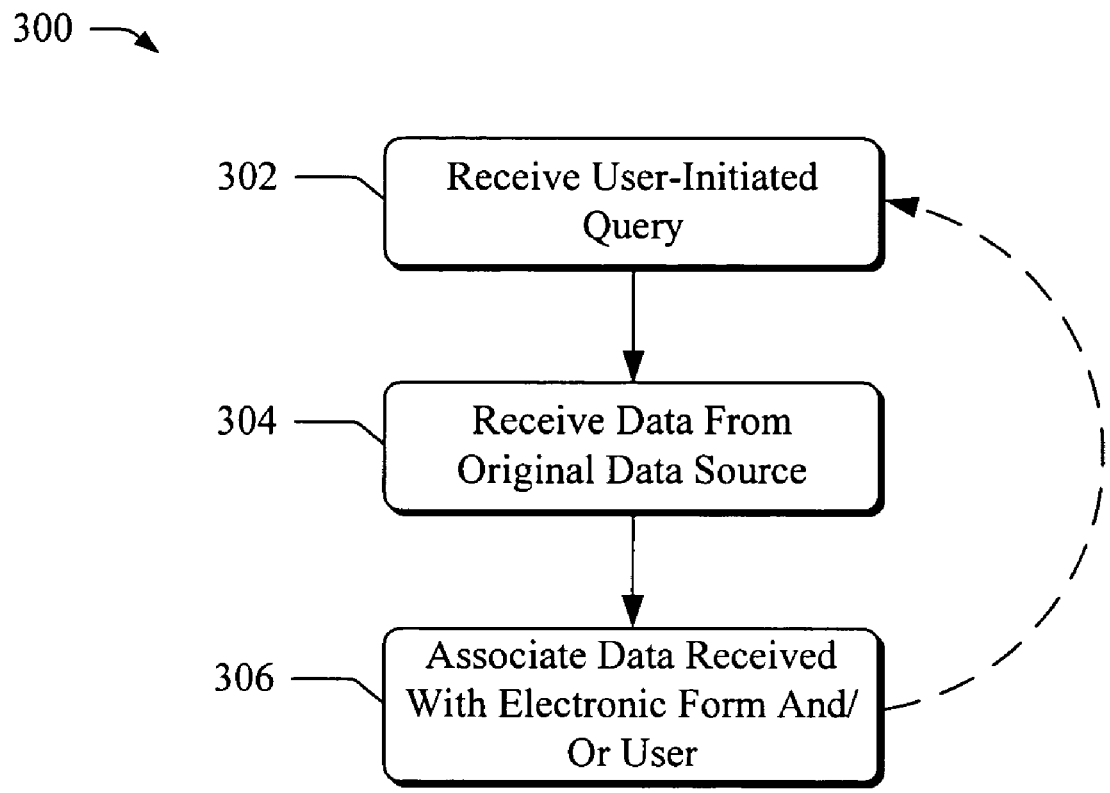
FIG. 3 is a flow diagram of an exemplary process for associating data with an electronic form.

An exemplary process 300 setting out some of these ways is shown in FIG. 3. Process 300 is illustrated as a series of blocks representing individual operations or acts performed by elements of the operating environment 100 of FIG. 1, such as provider application 114. This and other processes disclosed herein may be implemented in any suitable hardware, software, firmware, or combination thereof; in the case of software and firmware, these processes represent sets of operations implemented as computer-executable instructions stored in computer-readable media 110 and executable by processor 108.

At block 302, the tools receive a query through an electronic form. The electronic form may be locally accessible or accessible over network 104. This query may be initiated by a user selecting a control on an electronic form's template, entering data, opening the template, viewing the electronic form, editing an instance of the template, and the like. This action by the user initiates a query for data from some source external to the electronic form (e.g., one requiring a data connection).

The query may comprise parameters, such as those that make the query dynamic. Such a query may depend on another query having first been made, the effect of that first query affecting a parameter of the second query. For example, a first query may be for states in the United States from which the State of Idaho is selected. The second query, here for cities in a state, may be affected by comprising a parameter indicating that the State is Idaho. Thus, the data given in response to this second query is affected by a parameter—the State of Idaho—such that a proper response for the second query comprises Boise and Sun Valley rather than New York and Buffalo.

Other parameters making a query dynamic may not depend on a prior query but instead on an input made to the form. If a query is made for a person's address, for instance, the query may have a parameter of the person's name that was input by the user. With this name parameter, the data source may response to the query with an address based on the name in the query. Thus, queries may comprise parameters and, based on these parameters, require different data in response.

Continuing the illustrated embodiment, a student queries the electronic form for information by selecting a dropdown list through department control 206 of template 118 shown in FIG. 2. The student is querying the electronic form for a list of departments to choose from, the list not being available as part of the electronic form itself. The student may do so by double-clicking on the text "Department:", selecting a menu option, or selecting the department control's dropdown button 210. The student makes this selection as part of editing first instance 120 of FIG. 1.

At block 304, the tools receive data from the data's original data source with which to respond to the user-initiated query. The tools may receive this data from original data source 106 of FIG. 1 over network 104. In some embodiments the data is received from a data source available over the Internet. In some others, the data is received from a local data source capable of being inaccessible or unavailable at some future time when the electronic form is being edited rather than data within the electronic form itself. The tools may then respond to the user-initiated query using this received data.

Continuing the illustrated embodiment, the tools receive the data from Acme Technical College's registration office over the Internet. The tools then present a dropdown list of departments 402, shown in screen shot 400 of FIG. 4. The student's name and identification are also shown.

At block 306, the tools associate the received data with the electronic form, the user that initiated the query, the original data source (or its data adapter), and/or the query. The tools may do so through provider application 114. The tools record the data and associated it with various parameters so that it may be used again.

In one embodiment, the tools associate the data with the electronic form, the original data source's data adapter, and the user-initiated query for which the data was received. The tools may associate the data indirectly with the original data source using a data adapter of the query. A query often comprises or is associated with a data source through a data adapter. This data adapter may comprise a protocol or identifier specific to the data source, thereby enabling the data to be associated with the data source through the data source's adapter. In so doing, a user (the same or a different user from the one that initiated the query) may initiate a query through the electronic form and receive this data in response without the data being available from within the electronic form or through its original data source.

Continuing the illustrated embodiment, if another student edits the registration form and initiates a same or similar query for a list of departments, the tools may enable the registration form to provide the list without having to communicate with the registration office over the Internet.

In another embodiment, the tools associate the data with the user and the user-initiated query for which the data was received. In so doing, the same user may initiate a query through the same electronic form, another electronic form, or another version of the electronic form, and receive this data in response without the data being available through its original data source.

In still another embodiment, the tools associate the data with a group of users and the user-initiated query. This group may be selected by the user (such as family members or members of a company, etc.) or by a designer of the electronic form. By so doing, members of the group may receive this data when initiating a same or similar query.

In another embodiment, the tools associate the data with the electronic form and the query by caching the data locally along with an identifier for the user, the electronic form, the template of the electronic form, and the query itself. The tools may associate the data with the electronic form by storing the data at a location within a hierarchically structured framework representing the template of the electronic form. Thus, if a query is initiated through a particular control in the template (e.g., department control 206) the data used to respond may be stored or associated with the template. By so doing, the user may initiate a same or similar query to the same or another instance of the electronic form and receive the data in response without the electronic form communicating with the data's original data source.

Alternatively, the user or a designer of the electronic form may select that the data not be associated with the user and/or the electronic form's template, such as for privacy reasons or the data quickly becoming stale (e.g., data for stock-market quotes).

Also, the user or the designer of the electronic form may select a limit to the amount of data associated with the electronic form and/or user. In the case of caching data locally, for instance, the user may not want to store too much data on his computer. The user may select that older data be deleted, for instance, if the new data causes a limit to be exceeded.

Similarly, the user or the designer of the electronic form may select that data associated with the electronic form or the user that is of a certain age be deleted or disassociated.

The tools may continue to receive queries and associate the data received in response to these queries with the electronic form, the user that initiated the query, the original data source (or its data adapter), and/or the query. Thus, the process 300 may be repeated, shown with the dashed line from block 306 to block 302. By so doing, the tools may enable the electronic form to present data that is not within the instance of the electronic form and that was previously received through complex, cascading, and/or nested user-initiated queries.

For example, assume a user initiates a nested query by initiating a query for a first list and then initiating a query for another list based on an item selected from the first list. While storing all of the second lists for every possible item selected from the first list may be impractical, storing those second lists selected based on items selected from the first list may not be. Assume, for instance, that the first user-initiated query is for states of the United States of America. Assume that a second user-initiated query is based on a selection of New York State and is for all cities in New York. Assume that a third user-initiated query is based on a selection of Buffalo and is for a list of all Italian restaurants, their contact information, and menus. The tools permit data to be available for later use when the electronic form is offline with respect to the original data sources for these different sets of data. Thus, if the user later initiates a query for all Italian restaurants in Buffalo, N.Y., the tools may enable the electronic form to provide this list. Conversely, it may be impractical to store every possible iteration of these different lists, such as all restaurants, their contact information, and their menus in the entire United States of America.

Figure 5:
FIG. 5 illustrates the view of FIG. 4 without a dropdown list of college departments but with a dropdown list of classes for a selected department.

Continuing the illustrated embodiment, assume that the user selects the mathematics department shown at 404 in FIG. 4 and then initiates a query for a list of classes available from this department (such as through dropdown button 212). The tools receive this query at block 302. At block 304 the tools receive data from the data's original data source (the registration office or the mathematics department's registration office). The tools (e.g., the electronic form) may present these classes, shown at 502 of screen 500 in FIG. 5.

At block 306 the tools associate the data for the list of mathematics classes with the registration form, the student, and/or the query.

Providing Data

The following discussion describes exemplary ways in which the tools enable an electronic form to provide data in response to a query while offline with respect to or disconnected from a data source from which the data originated.

Figure 6:
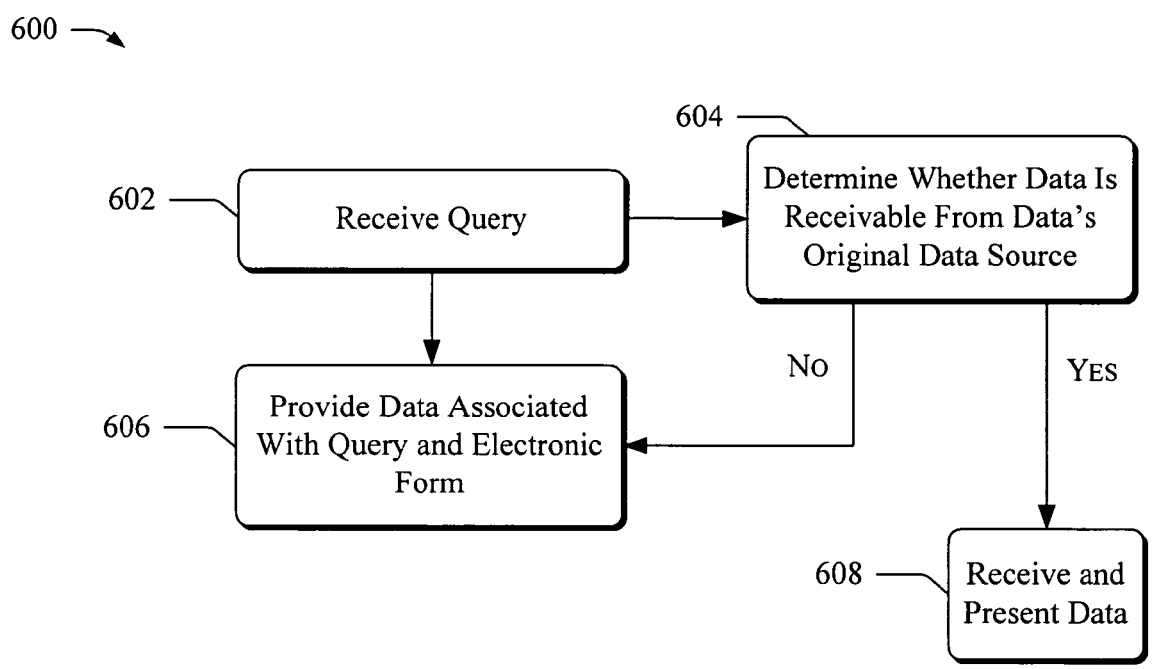
FIG. 6 is a flow diagram of an exemplary process for providing data in response to a query.

An exemplary process 600 setting out some of these ways is shown in FIG. 6. Process 600 is illustrated as a series of blocks representing individual operations or acts performed by elements of the operating environment 100 of FIG. 1, such as provider application 114.

At block 602, the tools receive a query through an electronic form. This query may be initiated by a user selecting a control on an electronic form's template, entering data, opening the template, editing an instance of the template, and the like. This query may be one similar or identical to one previously made through the electronic form (whether editing a same or different instance of the form). It may also be by the same user, a different user, or a user in the same group as the user that made a previous query for this data.

In another illustrated embodiment, the tools receive a user-initiated query to view a list of departments while offline with respect to Acme Technical College's registration department. The instance of the electronic form may be the same instance (first instance 120) or another instance, such as second instance 122. Thus, the student may be returning to the same instance of the registration form or to a new instance, such as to register for another class after completing registration for a first class.

From block 602, the tools may proceed to block 604 or skip block 604 and proceed directly to block 606. In some situations, a user may not wish to contact an original source even if it is available, such as when the original data source is only accessible over the Internet and the user has a slow Internet connection. A user may select to skip block 604.

At block 604, the tools determine whether data to respond to the user-initiated query may be received from the data's original data source. If the tools determine that the data is available from the original data source, the tools proceed along the "Yes" path to block 608. At block 608 the tools may receive and present the data from the original source. If, however, the tools determine that the original data source is not available, the tools proceed along the "No" path to block 606.

At block 606, the tools provide data associated with the query and the electronic form, if available. The tools may do so by comparing parameters for the query with query parameters associated with the data. The tools may also do so by comparing a current electronic form, template, or version with that of data associated with the other electronic forms, templates, and/or versions. Data associated with this query and electronic form may then be provided to the user.

Continuing the illustrated embodiment, the tools determine that the registration form has department data associated with it that was received to respond to a previous user-initiated query for a list of departments (e.g., the query received at block 302). The tools also determine that this department data is associated with the same query as is currently initiated.

The tools may then provide this data while offline with respect to the department data's original data source (that of the college's registration office). This provision may appear to the student identically or similarly to that shown in screen shot 400 at the list of departments 402 (though the student's name and identification may be different).

The tools may also determine whether or not to provide the data based on the user initiating the query, a template, and/or version of the electronic form. Thus, if a different user is initiating the query at block 602, the tools may not provide the data. If the version of the registration form is different, the tools may also not provide the data. Further, the tools may determine or be set such that the data is not provided if is of a particular age, such as being stale (like a department list from last year).

In another embodiment, the tools store the data, an identifier for the user, and query parameters in template 118 of electronic form 112. If the current instance (instance 122) and the previous instance (instance 120) are associated with the template, the tools (e.g., provider application 114) may determine to provide the data if the current query's parameters (which may be as simple as a selection of department dropdown button 210 through template 118) are the same or similar to those used at block 302. If the student initiated the query through a menu, rather than through the dropdown button 210, the tools may determine that this is a similar query so long as the data is useful in responding to both queries. If the template and its data are stored locally, such as on the user's desktop, the tools may, based on this location of the template and data, provide the data stored in the template. Also, the tools may compare an identifier of the user with a stored identifier in the template. The tools may provide the data based on whether the stored identifier matches the current user's identifier.

CONCLUSION

The above-described systems and methods enable electronic forms to provide data in response to a query while offline with respect to a data source from which the data originated. Although the system and method has been described in language specific to structural features and/or methodological acts, it is to be understood that the system and method defined in the appended claims is not necessarily limited to the specific features or acts described. Rather, the specific features and acts are disclosed as exemplary forms of implementing the claimed system and method.

The invention claimed is:

1. One or more computer-readable media, the one or more computer-readable media not being a signal, having computer-readable instructions therein that, when executed by a computer, cause the computer to perform acts comprising:

receiving a first selection of a data item in a first list of data items displayed in an instance of an electronic form, the first selection received while online with respect to the first list of data item's original data source, wherein an identifier of a user is associated with the first selection;

receiving a second list of data items associated with the data item responsive to receiving the first selection of the data item, the second list of data items received from the original data source;

displaying the second list of data items;

caching the data item, other data items in the first list of data items, the second list of data items, and additional lists of data items associated with the other data items in the first list of data items;

receiving a second selection of the data item or one of the other data items in the first list of data items displayed in another instance of the electronic form, wherein the identifier of the user is associated with the second selection; and providing, in response to the second selection, the second list of data items associated with the first data item or one of the additional lists of data items associated with one of the other data items in the first list of data items without communicating with the original data source and while offline with respect to the original data source, wherein the act of providing comprises retrieving the second list of data items associated with the data item or one of the additional lists of data items associated with the one of the other data items in the first list of data items from the local cache.

2. The media of claim 1, wherein the act of caching includes associating the identifier of the user with the data item, the other data items in the first list of data items, the second list of data items, and the additional lists of data items associated with the other data items in the first list of data items.

3. The media of claim 1, wherein the act of providing includes determining that the identifier of the user associated with the second selection is the same as the identifier of the user associated with the first selection.

4. One or more computer-readable media, the one or more computer-readable media not being a signal, having computer-readable instructions therein that, when executed by a computer, cause the computer to perform acts comprising:

receiving a first list of data items in response to a user accessing an instance of an electronic form template, the first list of data items received from a data source external to the electronic form template that is capable of being inaccessible;

displaying the first list of data items in the instance of the electronic form template; receiving a first selection of a data item in the first list of data items, wherein an identifier of the user is associated with the first selection;

receiving a second list of data items associated with the data item responsive to receiving the first selection of the data item, the second list of data items received from the data source external to the electronic form template;

displaying the second list of data items;

storing the data item, other data items in the first list of data items, the second list of data items, and additional lists of data items associated with the other data items in the first list of data items in a locally accessible source;

receiving, while offline with respect to the data source, a second selection of the data item or one of the other data items in the first list of data items displayed in another instance of the electronic form template, wherein the identifier of the user is associated with the second selection; and providing, in response to the second selection, the second list of data items associated with the data item or one of the additional lists of data items associated with one of the other data items in the first list of data items without communicating with the data source and while offline with respect to the data source.

5. The media of claim 4, wherein the act of storing includes associating the identifier of the user with the data item, the other data items in the first list of data items, the second list of data items, the and additional lists of data items associated with the other data items in the first list of data items.

6. The media of claim 4, wherein the act of providing includes determining that the identifier of the user associated with the second selection is the same as the identifier of the user associated with the first selection.

7. One or more computer-readable media, the one or more computer-readable media not being a signal, having computer-readable instructions therein that, when executed by a computer, cause the computer to perform acts comprising:

receiving a first selection of a data item in a first list of data items displayed in a first instance of an electronic form, the data item and the first list of data items received from a remote data source, wherein an identifier of a user is associated with the first selection;

receiving a second list of data items associated with the data item responsive to receiving the first selection of the data item, the second list of data items received from the remote data source;

displaying the second list of data items;

storing the data item, other data items in the first list of data items, the second list of data items, and additional lists of data items associated with the other data items in the first list of data items in a locally accessible source; and providing the second list of data items associated with the data item or one of the additional lists of data items associated with one of the other data items in the first list of data items in response to a second selection of the data item or one of the other data items in the first list of data items displayed in a second instance of the electronic form without communicating with the remote data source, wherein the identifier of the user is associated with the second selection.

8. The media of claim 7, wherein the first instance and the second instance are associated with a template of the electronic form.

9. The media of claim 7, wherein the first query and the second query comprise a same data adapter.

10. The media of claim 7, wherein the act of storing includes associating the identifier of the user with the data item, the other data items in the first list of data items, the second list of data items, and the additional lists of data items associated with the other data items in the first list of data items.

11. The media of claim 7, wherein the act of providing includes determining that the identifier of the user associated with the second selection is the same as the identifier of the user associated with the first selection.

* * * * *